United States Patent
Shah et al.

(10) Patent No.: US 10,304,298 B2
(45) Date of Patent: May 28, 2019

(54) BRAKING CHARACTERISTIC DETECTION SYSTEM FOR HAPTIC ACTUATOR

(71) Applicant: IMMERSION CORPORATION, San Jose, CA (US)

(72) Inventors: Kaniyalal Shah, San Jose, CA (US); Andrew Seaman, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/655,488

(22) Filed: Jul. 20, 2017

(65) Prior Publication Data

US 2018/0033262 A1 Feb. 1, 2018

Related U.S. Application Data

(60) Provisional application No. 62/367,422, filed on Jul. 27, 2016.

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
None
See application file for complete search history.

(56) References Cited

U.S. PATENT DOCUMENTS

| | | | | |
|---|---|---|---|---|
| 7,639,232 B2* | 12/2009 | Grant | ..................... | B06B 1/0215 345/156 |
| 8,210,942 B2* | 7/2012 | Shimabukuro | ..... | G07F 17/3209 200/314 |
| 8,380,561 B1* | 2/2013 | Viegas | ............... | G06Q 30/0201 119/174 |
| 8,757,812 B2* | 6/2014 | Melville | .............. | A61B 1/0008 353/85 |
| 9,152,232 B2* | 10/2015 | Hirose | ................... | G06F 3/0488 |
| 9,821,224 B2* | 11/2017 | Latta | ........................ | G09B 9/04 |
| 2014/0247227 A1* | 9/2014 | Jiang | ....................... | G06F 3/016 345/173 |
| 2015/0205352 A1* | 7/2015 | Grant | ...................... | G06F 1/163 345/156 |
| 2018/0123437 A1* | 5/2018 | Khoshkava | ........... | H02P 25/032 |

* cited by examiner

*Primary Examiner* — John F Mortell
(74) *Attorney, Agent, or Firm* — Miles & Stockbridge P.C.

(57) ABSTRACT

An actuator evaluation system evaluates one or more characteristics of an actuator usable as a haptic output device. The system can detect an optimal braking frequency of a drive signal that enables the actuator to provide a desired haptic effect in response thereto. The system sequentially applies a plurality of drive signals having different frequencies to the actuator and analyzes acceleration of the actuator to determine a drive signal that results in the desired braking performance.

27 Claims, 19 Drawing Sheets

BRAKING CHARACTERISTIC DETECTION SYSTEM FOR HAPTIC ACTUATOR

CROSS-REFERENCE TO RELATED APPLICATION(S)

This application claims the benefit of U.S. Patent Application Ser. No. 62/367,422 titled BRAKING CHARACTERISTIC DETECTION SYSTEM FOR HAPTIC ACTUATOR filed Jul. 27, 2016, the disclosure of which is hereby incorporated by reference in its entirety.

BACKGROUND

Haptic effects are used to enhance the interaction of an individual with a haptic-enabled device such as electronic devices, wearable articles, or other types of things. They are delivered through haptic actuators and typically enable the user to experience a tactile sensation. Haptic effects can be used to simulate a physical property or to deliver information such as a message, cue, notification, or acknowledgement or feedback confirming a user's interaction with the haptic-enabled device.

The characteristics of haptic effects can be determined by various factors. One factor is the braking performance of an actuator that produces haptic effects. When actuator motion is no longer desirable, faster deceleration of an actuator can create vibration patterns that feel much crisper than would be possible if the actuator were simply allowed to return to rest with no intervention. Improved braking, therefore, can increase the perceivable haptic bandwidth.

SUMMARY

In general terms, this disclosure is directed to a system for evaluating an actuator that is usable with a haptic feedback device. In one possible configuration, the system determines a frequency of a drive signal that results in an optimal braking performance of the actuator. Various aspects are described in this disclosure, which include, but are not limited to, the following aspects.

One aspect is a method for providing a desired haptic output. The method includes applying a first actuator drive signal to an actuator; applying a first actuator braking signal to the actuator, the first actuator braking signal having a first frequency and being out of phase to the first actuator drive signal; obtaining first acceleration data of the actuator in response to the first actuator drive signal and the first actuator braking signal; determining a first acceleration value, from the first acceleration data, at a time of braking the actuator; determining whether the first acceleration value meets a threshold value, the threshold value representative of an acceleration value for a predetermined braking characteristic; and applying a braking signal having the first frequency to the actuator to generate the desired haptic effect according to the predetermined braking character.

Another aspect is a system for providing a desired haptic output. The system includes an actuator, a sensor, an actuator drive circuit, and a processor. The sensor is associated with the actuator and configured to measure acceleration of the actuator. The actuator drive circuit is coupled to the sensor and configured to generate a first actuator drive signal; transmit the first actuator drive signal to the actuator to drive the actuator; generate a first actuator braking signal, the first actuator braking signal having a first frequency and being out of phase to the first actuator drive signal; transmit the first actuator braking signal to the actuator; and receive a data signal representative of acceleration of the actuator in response to the first actuator drive signal and the first actuator braking signal. The processor is coupled to the actuator drive circuit and configured to obtain first acceleration data based on the data signal; determine a first acceleration value, from the first acceleration data, at a time of braking the actuator; determine whether the first acceleration value meets a threshold value, the threshold value representative of an acceleration value for a predetermined braking characteristic; and apply a braking signal having the first frequency to the actuator to generate the desired haptic effect according to the predetermined braking character.

DETAILED DESCRIPTION

Figure 1:
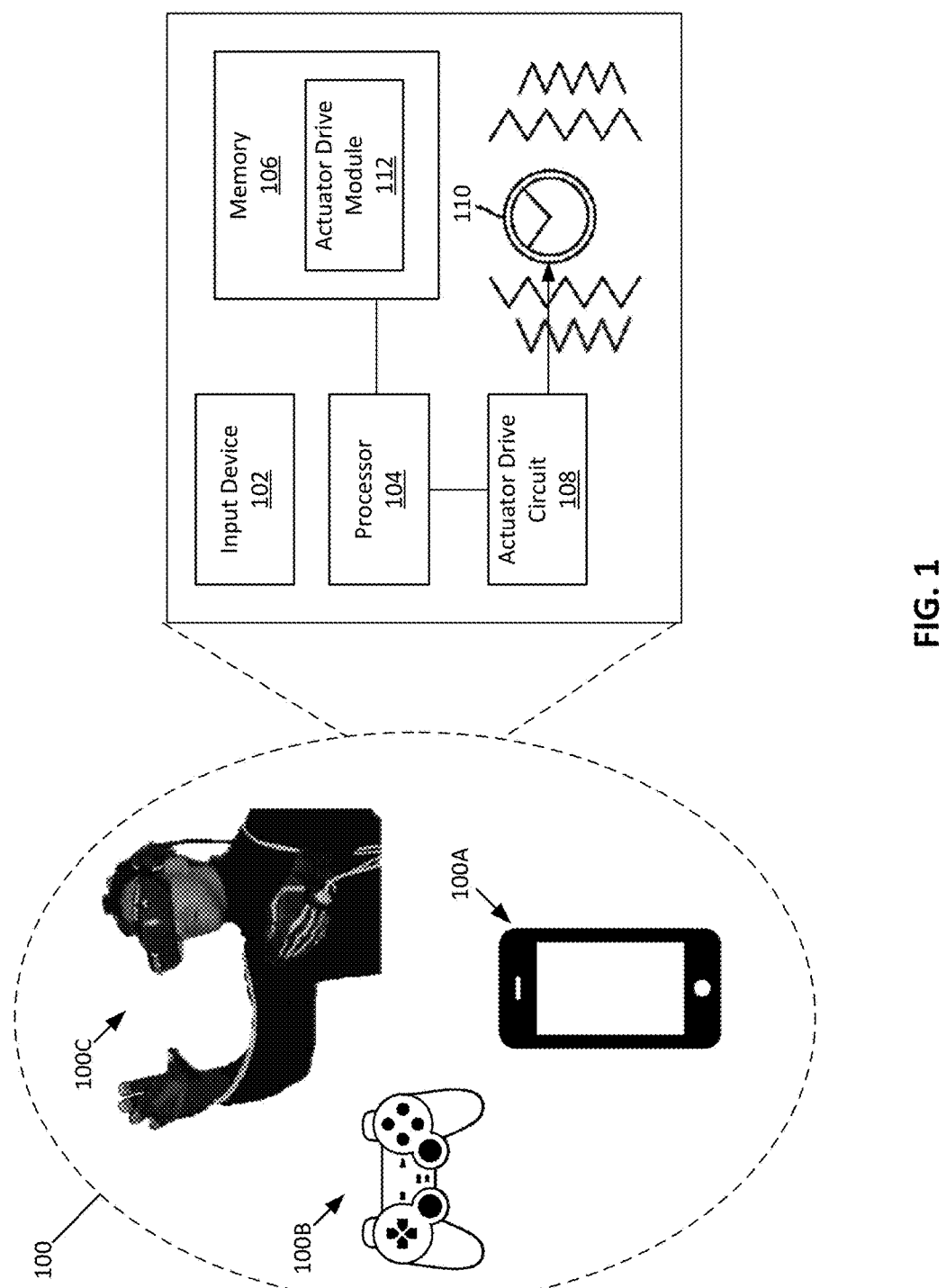
FIG. 1 illustrates a block diagram of one of many possible embodiments of a haptic enabled device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. Terms such as "comprise," "comprises," "comprising," "include," "includes," "including," "such as," "has," and "having" are interchangeable and not intended to be limiting. For example, the term "including" shall mean "including, but not limited to."

In general, the present disclosure relates to an actuator evaluation system. The system is configured to evaluate one or more characteristics of an actuator usable as a haptic output device. The system can store the characteristics of the actuator for use in a variety of haptic output applications. In an exemplary embodiment, the system enables a user to determine or select one or more parameters for a signal to apply to a haptic actuator to cause a braking effect and stop the haptic actuator from vibrating or slow the vibration. This braking effect helps the actuator to provide a more defined haptic effect or a desired haptic effect.

FIG. 1 illustrates a block diagram of one of many possible embodiments of a haptic enabled device 100. The haptic enabled device 100 can be of various types. The haptic enabled device 100 can be any type of device that can be used to deliver haptic effects, such as a cellular phone, a smart phone, a personal digital assistant (PDA), a portable music player, a portable video player, a game system, a virtual reality (VR) system, an automotive system, a navigation system, a desktop, a laptop computer, electronic appliances (e.g., a television, an oven, a washer, a dryer, a refrigerator, or a lighting system), and any other electronic or computing devices capable of processing information as well as providing haptic feedback. In FIG. 1, a mobile computing device 100A, a gaming console 100B, and a virtual reality (VR) system 100C are shown only for illustrative purposes.

A haptic effect or haptic feedback can be any type of tactile sensation delivered to a person. In some embodiments, the haptic effect embodies information such as a cue, notification, feedback or confirmation of a user's interaction with a haptic-enabled article, or a more complex message or other information. In alternative embodiments, the haptic effect can be used to enhance a user's interaction with a device by simulating a physical property or effect such as friction, flow, and detents.

The haptic enabled device 100 includes an input device 102, a processor 104, memory 106, an actuator drive circuit 108, and an actuator 110. In some embodiments and as illustrated in FIG. 1, the input device 102, the processor 104, the memory 106, the actuator drive circuit 108, and the actuator 110 are incorporated into a single device, which can be worn or carried by a user. In other embodiments, at least one of the input device 102, the processor 104, the memory 106, the actuator drive circuit 108, and the actuator 110 is separately arranged from the others and connected to each other either wirelessly or by wire.

The input device 102 is configured to monitor or detect one or more events associated with the haptic enabled device 100 or a user of the haptic enabled device 100, or one or more events performed by the user, of which the user can be informed with a haptic feedback. The input device 102 is any device that inputs a signal into the processor 104.

An example of an input device 102 is a touch sensitive surface or other type of user interface mounted within a housing of the device 100, such as a mouse, touchpad, mini-joystick, scroll wheel, trackball, game pads or game controllers. Another example of an input device 102 is a control device such as a key, button, switch or other type of user interfaces. Yet another example of an input device 102 is a transducer that inputs a signal into the processor 104. Examples of transducers that can be used as an input device 102 include one or more antennas and sensors.

A sensor can be any instrument or other device that outputs a signal in response to receiving a stimulus. The sensor can be hardwired to the processor or can be connected to the processor wirelessly. The sensor can be used to detect or sense a variety of different conditions, events, environmental conditions, the operation or condition of the device 100, the presence of other people or objects, or any other condition or thing capable of stimulating a sensor.

Examples of sensors include acoustical or sound sensors such as microphones; vibration sensors; chemical and particle sensors such as breathalyzers, carbon monoxide and carbon dioxide sensors, and Geiger counters; electrical and magnetic sensors such as voltage detectors or hall-effect sensors; flow sensors; navigational sensors or instruments such as GPS receivers, altimeters, gyroscopes, or accelerometers; position, proximity, and movement-related sensors such as piezoelectric materials, rangefinders, odometers, speedometers, shock detectors; imaging and other optical sensors such as charge-coupled devices (CCD), CMOS sensors, infrared sensors, and photodetectors; pressure sensors such as barometers, piezometers, and tactile sensors; force sensors such as piezoelectric sensors and strain gauges; temperature and heat sensors such as thermometers, calorimeters, thermistors, thermocouples, and pyrometers; proximity and presence sensors such as motion detectors, triangulation sensors, radars, photo cells, sonars, and hall-effect sensors; biochips; biometric sensors such as blood pressure sensors, pulse/ox sensors, blood glucose sensors, and heart monitors. Additionally, sensors can be formed with smart materials, such as piezo-electric polymers, which in some embodiments function as both a sensor and an actuator.

Various embodiments can include a single input device or can include two or more input devices. Additionally, various embodiments can include different types of input devices. For example, at least some possible embodiments include a switch and a transducer such as an antenna or a sensor. When the input device 102 is stimulated and inputs a signal to the processor 104, the processor 104 operates an actuator 110 to provide a haptic effect to the person carrying, wearing or interacting with the device 100.

The processor 104 can be any device, element, or circuit configured to process information and can include any suitable analog or digital circuit. The processor 118 also can include a programmable circuit that executes instructions. Examples of programmable circuits include microprocessors, microcontrollers, application specific integrated circuits (ASIC), programmable gate arrays (PLA), field programmable gate arrays (FPGA), or any other processor or hardware suitable for executing instructions. In various embodiments, the processor 118 can be a single unit or a combination of two or more units. If the processor 118 includes two or more units, the units can be physically located in a single controller or in separate devices. The processor 104 may be the same processor that operates the entire device 100, or may be a separate processor. The processor 104 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect.

The processor 104 receives signals or data from the input device 102 and outputs control signals to drive the actuator drive circuit 108. Data received by the processor 104 can be any type of parameters, instructions, flags, or other information that is processed by the processors, program modules, and other hardware disclosed herein.

The memory device 106 can be any type of storage device or computer-readable medium, such as random access memory (RAM), read-only memory (ROM), electrically erasable programmable read only memory (EPROM), flash memory, magnetic memory, optical memory, or any other suitable memory technology. The memory 106 also can include a combination of volatile and nonvolatile memory. The memory 106 stores instructions executed by the processor 104. The memory 106 may also be located internal to the processor 104, or any combination of internal and external memory.

Among the instructions, the memory 106 includes an actuator drive module 112 which are instructions that, when executed by the processor 104, generate control signals for the actuator drive circuit 108. The actuator drive module 112 can also determine feedback from the actuator 110 and adjust the control signals accordingly.

The actuator drive circuit 108 is a circuit that receives a haptic signal (which is also referred to herein as a control signal) from the actuator drive module 112. The haptic signal embodies haptic data associated with haptic effects, and the haptic data defines parameters the actuator drive circuit 108 uses to generate an actuator drive signal. In exemplary embodiments, such parameters relate to, or are associated with, electrical characteristics. Examples of electrical characteristics that can be defined by the haptic data includes frequency, amplitude, phase, inversion, duration, waveform, attack time, rise time, fade time, and lag or lead time relative to an event. The actuator drive signal is applied to the actuator 110 to cause one or more haptic effects.

The actuator 110, which is also referred to herein as a haptic output device, operates to generate haptic effects. The actuator 110 is controlled by the processor 104 that executes the actuator drive module 112, which sends a haptic signal to the actuator drive circuit 108. The actuator drive circuit 108 then generates and applies an actuator drive signal to the actuator 110 to drive the actuator 110. When applied to the actuator 110, an actuator drive signal causes the actuator 110 to generate haptic effects by activating and braking the actuator 110.

Figure 2:
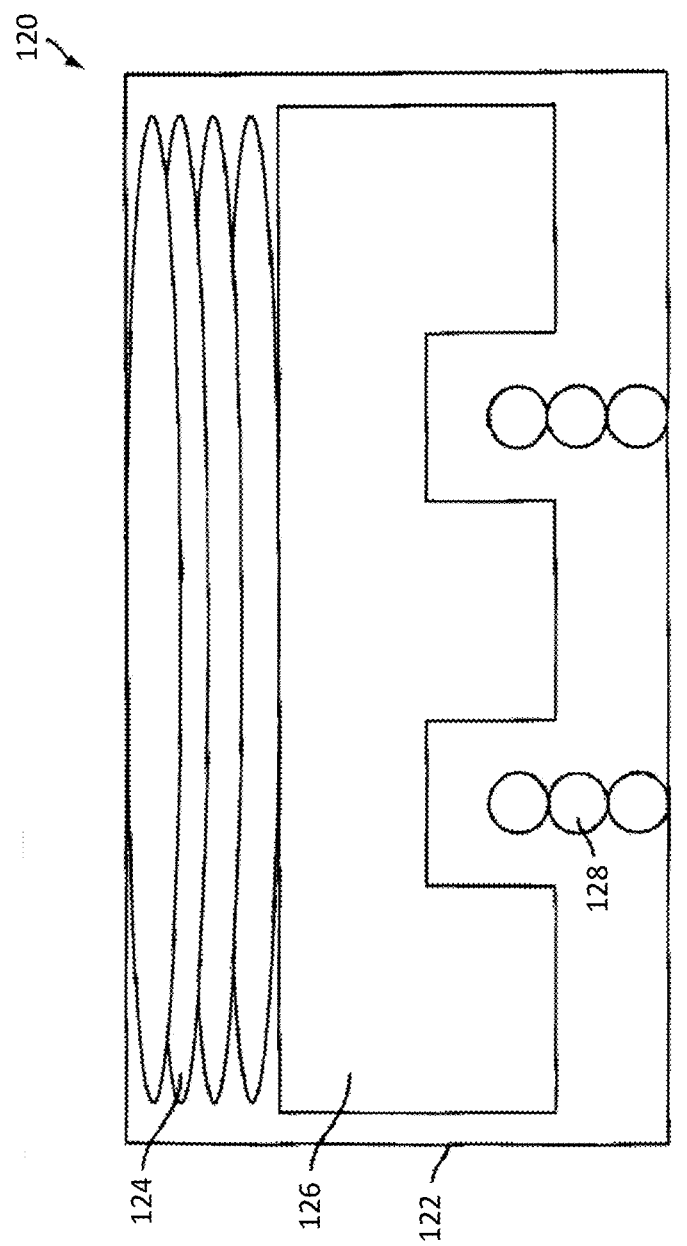
FIG. 2 is a schematic cross sectional diagram of an LRA in accordance to one possible embodiment.

The actuator 110 can be of various types. In the illustrated embodiments, the actuator is a resonant actuator, such as a Linear Resonant Actuator (LRA) in which a mass attached to a spring is driven back and forth. An example configuration and operation of the LRA is illustrated in FIG. 2. In other embodiments, the actuator is a solenoid resonant actuator (SRA).

Other types of electromagnetic actuators are also used, such as an Eccentric Rotating Mass (ERM) in which an eccentric mass is moved by a motor or a "smart material" such as piezoelectric, electro-active polymers or shape memory alloys. Actuators 110 also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

The device 100 may include more than one actuator 110, and each actuator may include a separate actuator drive circuit 108, all coupled to the processor 104. In embodiments with more than one actuator, each actuator can have a different output capability in order to create a wide range of haptic effects on the device.

Referring still to FIG. 1, the actuator drive circuit 108 is configured to generate an actuator braking signal configured to brake the actuator 110 so that the actuator 110 decelerates. By way of example, when a smartphone detects an incoming call or message, it generates an actuator drive signal to drive the actuator to generate vibration, thereby alerting the user of the smartphone to the incoming call or message. Then to stop the vibration, the smartphone generates an actuator braking signal to brake the actuator and halts the vibration. By activating and braking the actuator in sequence, the smartphone can generate a variety of vibrotactile haptic effects.

In one embodiment, an actuator braking signal is configured to be out of phase to an actuator drive signal. For example, the actuator braking signal is approximately 180 degrees out of phase with the actuator drive signal. In one possible embodiment, the actuator braking signal is generated by inverting the actuator drive signal. In another possible embodiment, the actuator braking signal is generated by shifting the phase of the actuator drive signal other than 180 degrees out of phase. For example, the signal is inverted or shifted 180 degrees out of phase when the phase is changed at zero-crossings where the amplitude of the signal is substantially zero. In yet other possible embodiments, the actuator braking signal is generated by changing the frequency of the actuator drive signal. For example, the frequency of the actuator drive signal is doubled for one or more cycles and is returned to the original frequency so that the phase is inverted. In yet other embodiments, the actuator braking signal is generated by stopping the actuator drive signal for a predetermined time before resuming. For example, the actuator drive signal can be stopped for a half cycle and then generated so that the resumed signal is out of phase to the original actuator drive signal.

In some possible embodiments, the actuator braking signal has the same frequency as the actuator drive signal. In other embodiments, the actuator braking signal has a frequency different from the actuator drive signal. In some possible embodiments, the actuator braking signal has the same amplitude as the actuator drive signal. In other embodiments, the actuator braking signal has amplitude different from the actuator drive signal.

In this document, the term "drive signal" or "actuator drive signal" can also be used to incorporate an actuator braking signal. For example, when an actuator braking signal is applied to an actuator to brake the actuator after an actuator drive signal is applied to the actuator to activate the actuator, the entire signal can be referred to as a drive signal or actuator drive signal.

FIG. 2 is a schematic cross sectional diagram of an LRA implementation 120 of the actuator 110 in accordance to one possible embodiment. The LRA 120 includes a casing 122, a magnet/mass 126, a linear spring 124, and an electric coil 128. The magnet 126 is mounted to the casing 122 by the spring 124. The coil 128 is mounted directly on the bottom of the casing 122 underneath the magnet 126. The LRA 120 is typical of any known LRA. In operation, when current flows through the coil 128, a magnetic field forms around the coil 128 and, in interaction with the magnetic field of the magnet 126, pushes or pulls on the magnet 126. One current flow direction/polarity causes a push action and the other a pull action. The spring 124 controls the up and down movement of the magnet 126 and has a deflected up position where it is compressed, a deflected down position where it is expanded, and a neutral or zero-crossing position where it is neither compressed or deflected and which is equal to its resting state when no current is being applied to the coil 128 and there is no movement/oscillation of the magnet 126.

Figure 3:
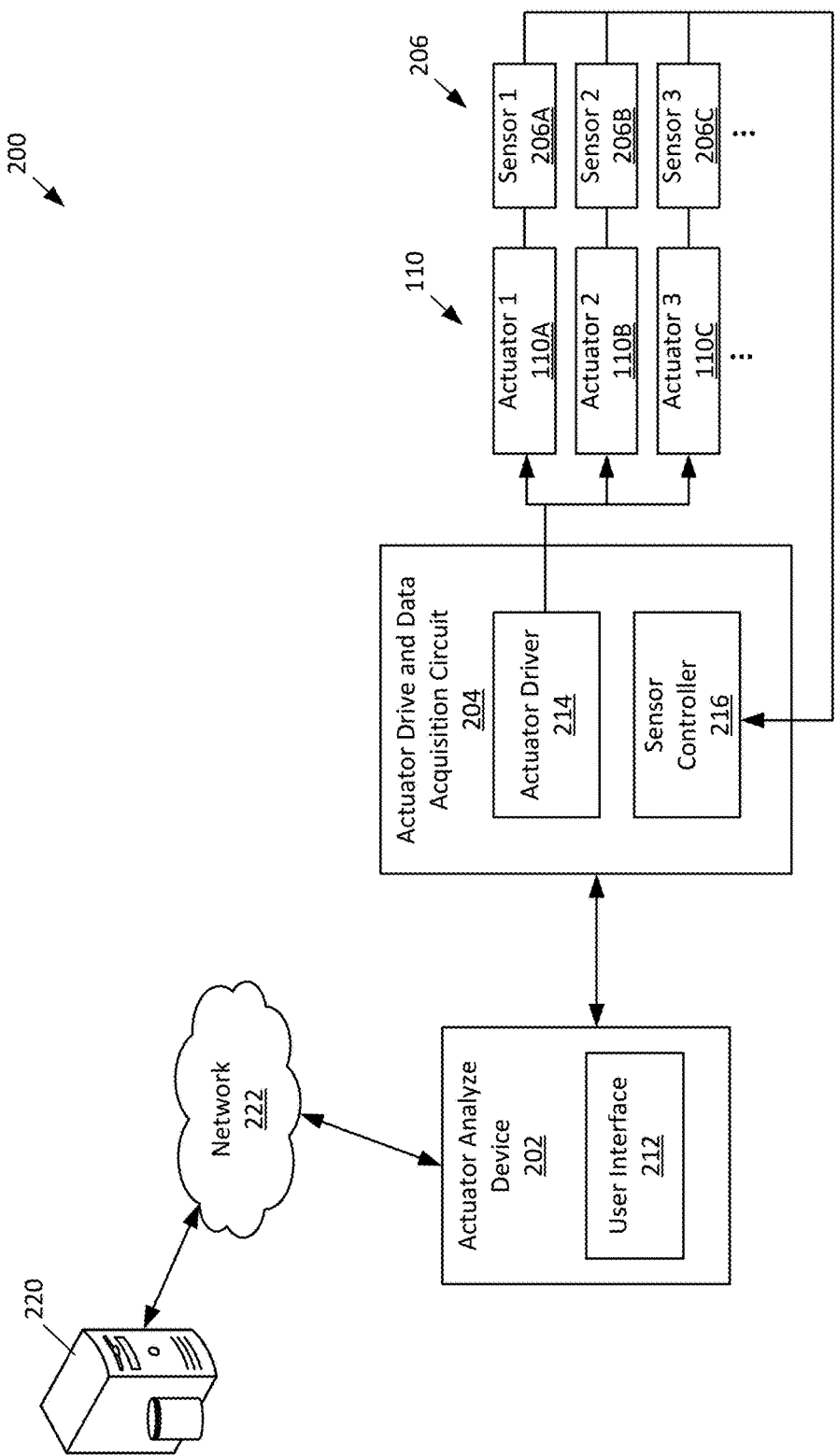
FIG. 3 illustrates a block diagram of one of many possible embodiments of an actuator evaluation system.

FIG. 3 illustrates a block diagram of one of many possible embodiments of an actuator evaluation system 200. The actuator evaluation system 200 is configured to evaluate one or more characteristics, performance, parameters, attributes, events, operational conditions, environmental conditions, and/or other data associated with an actuator 110 which can be used with a haptic enabled device 100 as illustrated in FIG. 1.

In the specific embodiments disclosed herein, the actuator evaluation system 200 is configured to determine an optimal braking frequency associated with an actuator. Such an optimal braking frequency is a frequency of an actuator braking signal that generates a predetermined braking characteristic of the actuator. For example, a manufacturer or user of the actuator can determine a targeted braking characteristic of the actuator, and the optimal braking frequency is a frequency that provides such a targeted braking characteristic of the actuator. In one possible embodiment, the optimal braking frequency causes the actuator to decelerate below a threshold value. The threshold value can be determined to represent an acceleration value for such a predetermined braking characteristic. In one embodiment, such a predetermined braking characteristic is an acceleration value of the actuator that is below a predetermined value. Such an acceleration value lower than the predetermined value can indicate that the actuator stops as quickly as desired. In other embodiments, the optimal braking frequency is a frequency that produces the minimal acceleration value of the actuator.

Another example of the braking characteristics is a time delay of braking the actuator in response to an actuator braking signal. In other embodiments, other braking characteristics can be evaluated with the system 200.

To evaluate one or more of the actuators 110, the system 200 includes an actuator analyze device 202, an actuator drive and data acquisition circuit 204, and one or more sensors 206. Although the devices of the system 200 are illustrated as being separately provided in FIG. 3, it is noted that at least two of the devices, such as the actuator analyze device 202, the actuator drive and data acquisition circuit 204, and the sensors 206 are incorporated into a single device.

In the specific embodiments disclosed herein, examples of actuators 110 that can be evaluated with the system 200 include resonant actuators, such as a LRA and a SRA. In other embodiments, other types of actuators can be tested by the system 200 in accordance with the principles of the present disclosure.

The actuator analyze device 202 is in communication with the actuator drive and data acquisition circuit 204 to transmit a control signal to the circuit 204 and receive a data signal from the circuit 204.

A control signal is configured to cause an actuator driver 214 of the circuit 204 to generate and apply a drive signal to one or more of the actuators 110 for evaluation. As described herein, the actuator analyze device 202 generates the control signal based at least on parameters received from a user interface 212.

A data signal can be generated by one or more of the sensors 206 (such as 206A, 206B, and 206C) that are associated with the corresponding actuators 110 (such as 110A, 110B, and 110C). The data signal includes information about measurements that the sensors 206 detect from the actuators 110. Such measurements relate to one or more characteristics, parameters, attributes, events, operational conditions, environmental conditions, and other data associated with the actuators 110. In the specific embodiments disclosed herein, the measurements include acceleration data of the actuators 110. In one embodiment, the data signal can be transmitted to the circuit 204, such as the sensor controller 216 of the circuit 204, which is then transmitted to the actuator analyze device 202. In other embodiments, the data signal is transmitted from the sensors 206 directly to the actuator analyze device 202. The information contained in the data signal can be presented to the user through the user interface 212 of the device 202 in various formats.

The actuator drive and data acquisition circuit 204 includes an actuator driver 214 configured to receive a control signal from the actuator analyze device 202, and generate and apply a drive signal to one or more of the actuators 110. As described herein, the actuator driver 214 generates a plurality of drive signals with different parameters to monitor the change in performance of an actuator 110 in response to such different drive signals. In the specific embodiment discussed herein, a plurality of drive signals with different frequencies are applied to an actuator 110 to monitor the braking performance of the actuator 110. By evaluating the change in braking performance of the actuator 110 in response to different frequencies of drive signals, an optimal braking frequency can be determined, which provides a desired or targeted braking performance of the actuator. The optimal braking frequency is discussed in more detail herein.

The actuator drive and data acquisition circuit 204 further includes a sensor controller 216 configured to control the sensors 206 and receive data signals from the sensors 206.

The sensors 206 are associated with the corresponding actuators 110 to sense one or more characteristics, parameters, attributes, events, operational conditions, environmental conditions, or other data associated with the actuators 110. In the specific embodiment disclosed herein, the sensors 206 include accelerometers, which are used to obtain acceleration data of the actuators 110. Other types of sensors can be used to sense other characteristics of the actuators.

The sensors 206 can be connected to the actuators in various ways. The sensors 206 can be either directly or indirectly coupled to the actuators 110. The sensors 206 can be mounted in various locations. In one possible embodiment, the sensors 206 are mounted directly to the actuators. In other possible embodiments, the sensors 206 are mounted to other locations remote from the actuators.

Figure 14:
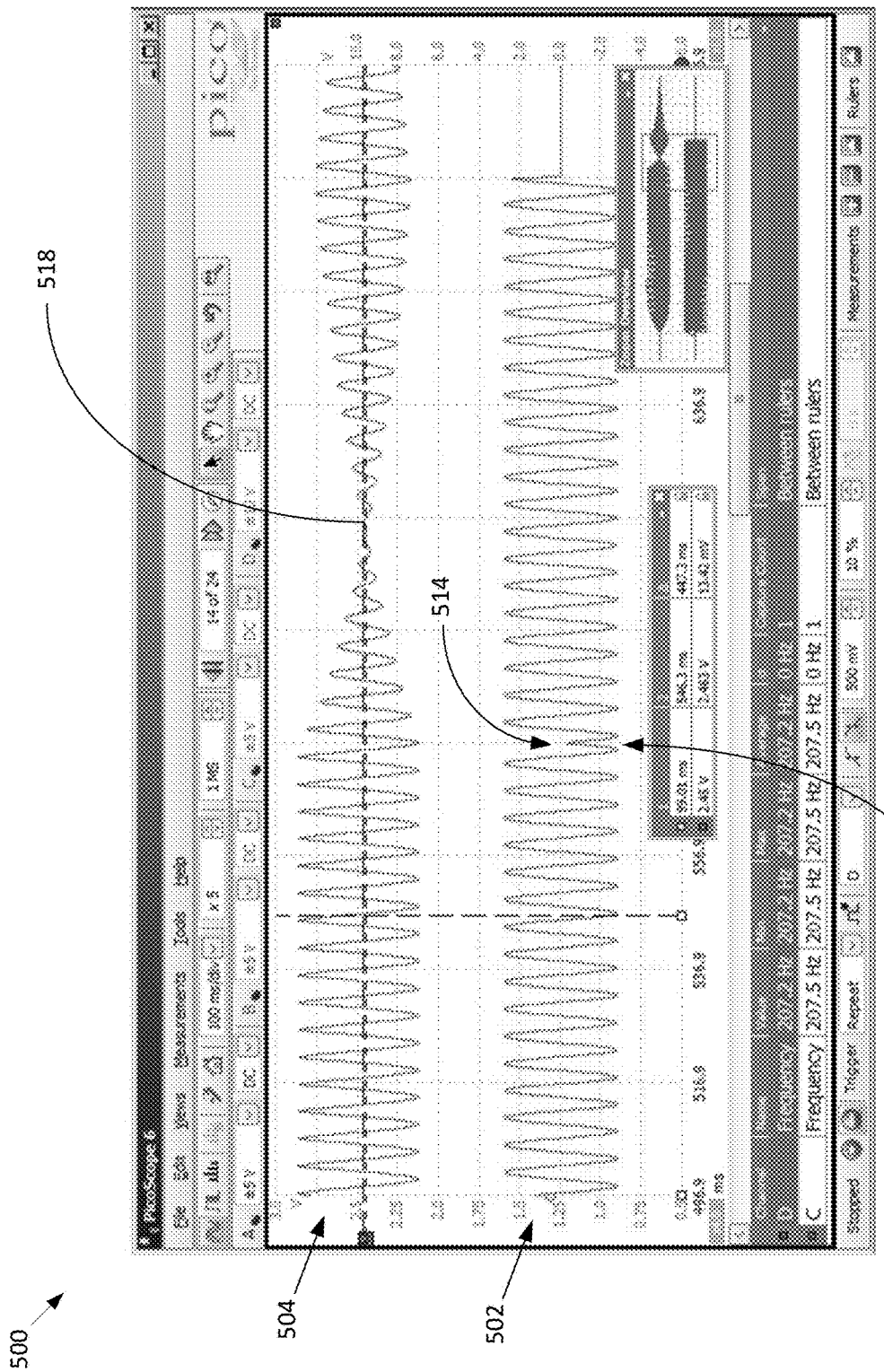
FIG. 14 illustrates an example result of applying a drive signal to an actuator.
Figure 15:
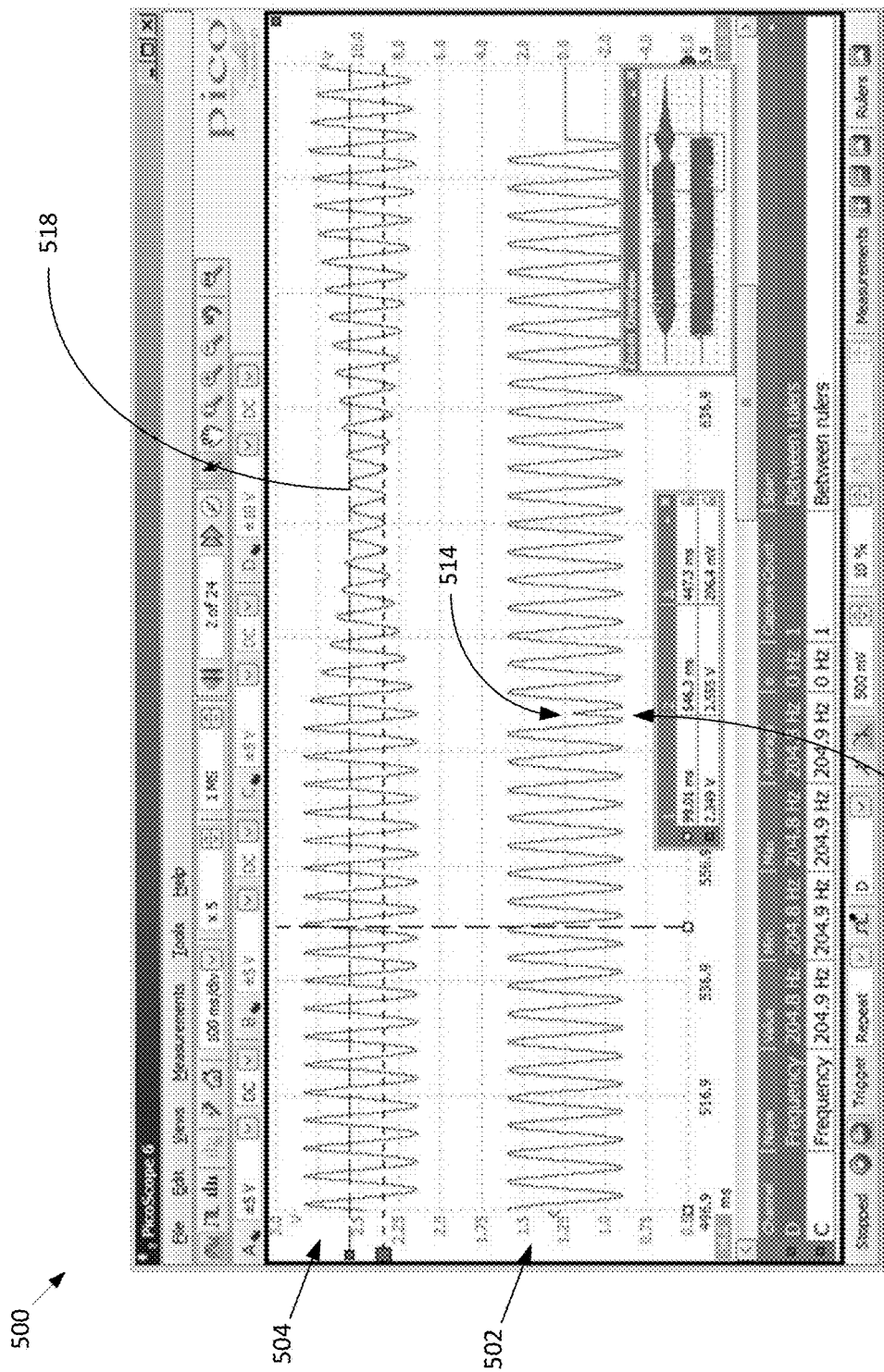
FIG. 15 illustrates another example result of applying a drive signal to an actuator.
Figure 16:
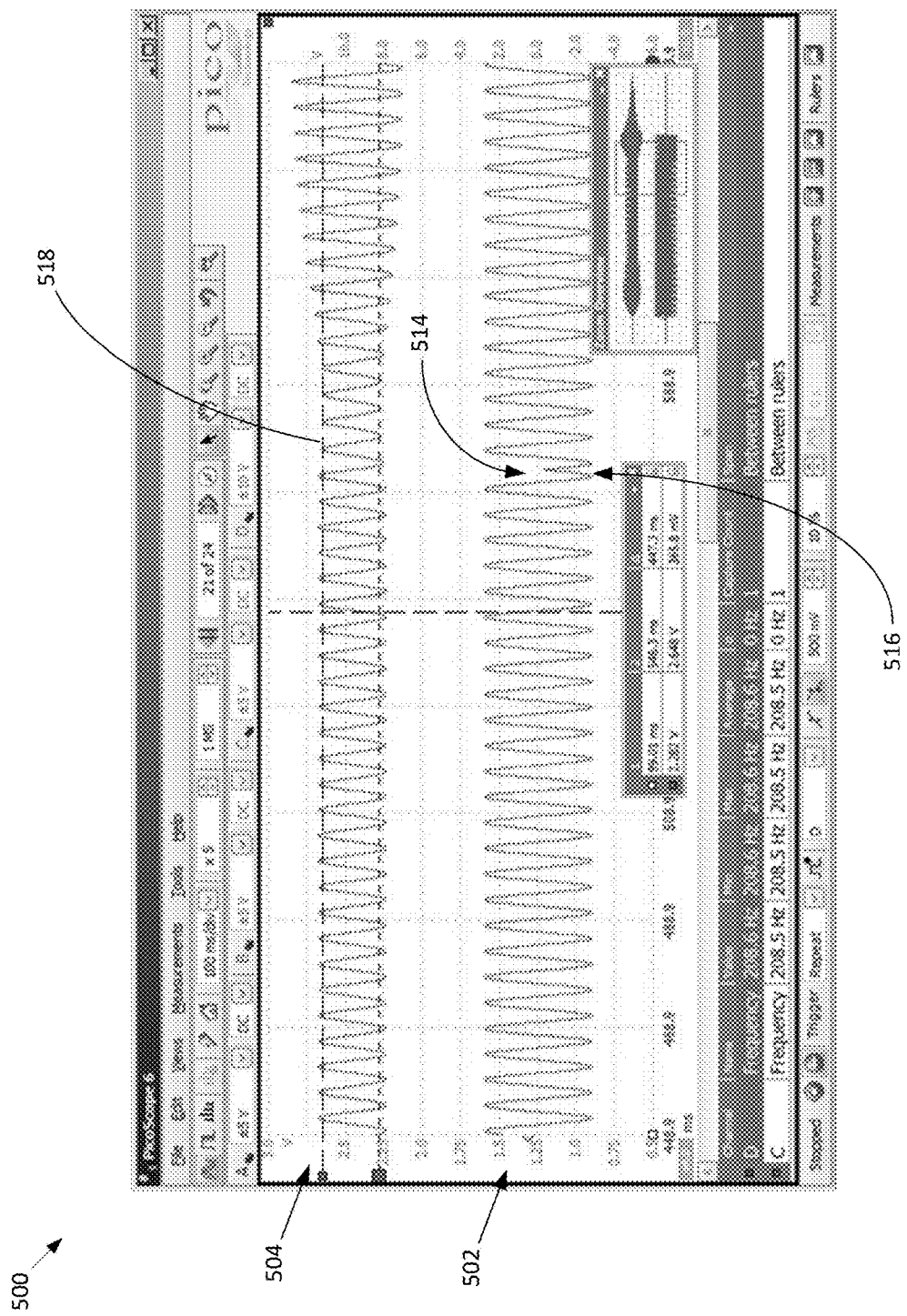
FIG. 16 illustrates yet another example result of applying a drive signal to an actuator.

The sensors 206 can be associated with the corresponding actuators 110 in various arrangements. In one embodiment, the sensors 206 are arranged with respect to the actuators 110 to detect a single dimensional movement, such as a vibration in Z-axis (i.e., up and down). In other embodiments, the sensors 206 are configured to detect two-dimensional (i.e., up-and-down and side-to-side) or three-dimensional movements (i.e., up-and-down, side-to-side, and back-and-forth) of the actuators 110.

Where accelerometers are used as the sensors 206, accelerometer data provided from the sensors may be used to generate a graphical representation of the acceleration output, as illustrated in FIGS. 14-16. In the illustrated embodiments of FIGS. 14-16, only a single dimension of acceleration data is used to evaluate the braking performance of the actuators. In other embodiments, the acceleration data can be plotted in two or three dimensions.

With continued reference to FIG. 2, in some possible embodiments, the actuator analyze device 202 is configured to communicate with a data management system 220 via a data communication network 222. In one embodiment, the data management system 220 operates to process data transmitted from the actuator analyze device 202 and evaluate the data, either along with or instead of the actuator analyze device 202. The data management system 220 can also operate to manage other types of data associated with the actuator evaluation system 200 and the haptic enabled device 100.

The data communication network 222 communicates digital data between one or more computing devices, such as between the actuator analyze device 202 and the data management system 220 and between the actuator drive and data acquisition circuit 204 and the data management system 220. The network 222 also can be established among the actuator analyze device 202, the actuator drive and data acquisition circuit 204, the actuators 110, the sensors 206, and other devices or elements in the system 200. Examples of the network 222 include a local area network and a wide area network, such as the Internet. In some embodiments, the network 108 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

Figure 4:
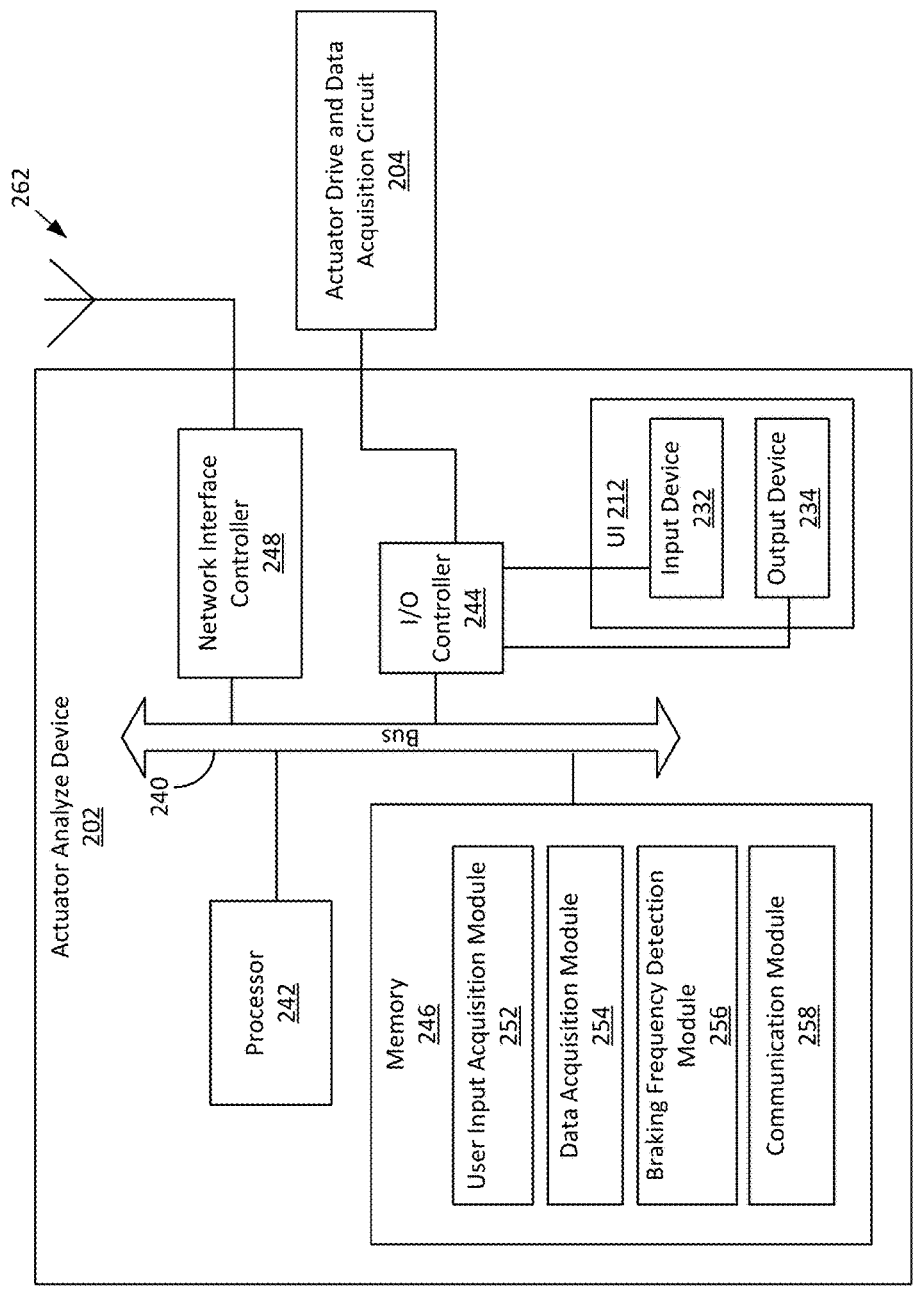
FIG. 4 illustrates a more detailed block diagram of a possible embodiment of an actuator analyze device as illustrated in FIG. 3.

FIG. 4 illustrates a more detailed block diagram of a possible embodiment of the actuator analyze device 202 as illustrated in FIG. 3.

In this embodiment, as discussed in FIG. 3, the actuator analyze device 202 includes the user interface 212. The user interface 212 can include an input device 232 and an output device 234. The input device 232 includes any device or mechanism through which a user can input parameters, commands, and other information into the actuator analyze device 202. Examples of input device 232 include touchscreens, touch sensitive surfaces, cameras, mechanical inputs such as buttons and switches, and other types of input components. The output device 234 includes any device or mechanism that presents information to a user in various formats, such as visual and audible formats. Examples of output device 234 include display screens, speakers, lights, and other types of output components. In one embodiment, the input device 232 and the output device 234 are integrally formed, such as a touch-sensitive display screen.

The device 202 includes a bus 240, a processor 242, an input/output (I/O) controller 244, memory 246, and a network interface controller (NIC) 248. The bus 240 includes conductors or transmission lines for providing a path to transfer data between the components in the device 202 including the processor 242, the I/O controller 244, the memory 246, and the NIC 248. The bus 240 typically comprises a control bus, address bus, and data bus. However, the bus 240 can be any bus or combination of busses, suitable to transfer data between components in the device 202.

The processor 242 can be any circuit configured to process information and can include any suitable analog or digital circuit. The processor 242 also can include a programmable circuit that executes instructions. Examples of programmable circuits include microprocessors, microcontrollers, application specific integrated circuits (ASIC), programmable gate arrays (PLA), field programmable gate arrays (FPGA), or any other processor or hardware suitable for executing instructions. In various embodiments, the processor 242 can be a single unit or a combination of two or more units. If the processor 242 includes two or more units, the units can be physically located in a single controller or in separate devices.

The I/O controller 244 is circuitry that monitors operation of the device 202 and peripheral or external devices such as the user interface 212 and the actuator drive and data acquisition circuit 204. The I/O controller 244 also manages data flow between the device 202 and the peripheral devices and frees the processor 242 from details associated with monitoring and controlling the peripheral devices. Examples of other peripheral or external devices with which the I/O controller 244 can interface includes external storage devices; monitors; input devices such as keyboards and pointing devices; external computing devices; antennas; other articles worn by a person; and any other remote devices.

The memory 246 can include volatile memory such as random access memory (RAM), read only memory (ROM), electrically erasable programmable read only memory (EPROM), flash memory, magnetic memory, optical memory, or any other suitable memory technology. The memory 246 also can include a combination of volatile and nonvolatile memory.

The memory 246 can store a number of program modules for execution by the processor 242, including a user input acquisition module 252, a sensor data acquisition module 254, a braking frequency detection module 256, and a communication module 258. Each module is a collection of data, routines, objects, calls, and other instructions that perform one or more particular task. Although certain modules are disclosed herein, the various instructions and tasks described herein can be performed by a single module, different combinations of modules, modules other than those disclosed herein, or modules executed by remote devices that are in communication, either wirelessly or by wire, with the device 202.

The user input acquisition module 252 are instructions that, when executed by the processor 242, cause the processor 242 to receive user inputs of one or more parameters associated with the evaluation of one or more actuators 110. The user input acquisition module 252 can communicate with the input device 232 of the user interface 212 and enable a user to input such parameters through the input device 232. By way of example, the user input acquisition module 252 provides a graphical user interface on a display screen (i.e., the input device 232) that allows a user to enter or select one or more parameters for evaluation of the actuators 110. An example method of operating the user input acquisition module 252 is illustrated in more detail with reference to FIG. 6.

The sensor data acquisition module 254 are instructions that, when executed by the processor 242, cause the processor 242 to receive data signals from the sensors 206. In the specific embodiment discussed herein, the data signals include information about acceleration values of the actuators 110 sensed by the sensors 206.

The braking frequency detection module 256 are instructions that, when executed by the processor 242, cause the processor 242 to analyze the data received from the sensor data acquisition module 254 and evaluate one or more characteristics or performance of the actuators in question. In the specific embodiment discussed herein, the braking frequency detection module 256 is configured to determine an optimal braking frequency of an actuator drive signal that stops the actuator as intended (e.g., as quickly as possible, gradually fading, or other transition) in order to generate more compelling and pleasing haptic effects.

The communication module 258 facilitates communication between the device 202 and remote devices. Examples of remote devices include computing devices, sensors, actuators, networking equipment such as routers and hotspots, vehicles, exercise equipment, and smart appliances. Examples of computing devices include servers, desktop computers, laptop computers, tablets, smartphones, home automation computers and controllers, and any other device that is programmable. The communication can take any form suitable for data communication including communication over wireless or wired signal or data paths. In various embodiments, the communication module may configure the device 202 as a centralized controller of the actuator evaluation system 200 or other remote devices, as a peer that communicates with other computing devices or other remote devices, or as a hybrid centralized controller and peer such that the controller can operate as a centralized controller in some circumstances and as a peer in other circumstances.

Alternative embodiments of the program modules are possible. For example, some alternative embodiments might have more or fewer program modules than the user input acquisition module 252, the sensor data acquisition module 254, the braking frequency detection module 256, and the communication module 258. In some possible embodiments, one or more of the program modules are in remote devices such as remote computing devices or other wearable articles.

Referring still to FIG. 4, the network interface controller (NIC) 248 is in electrical communication with an antenna 262 to provide wireless communication between the device 202 and remote devices. As described herein, the communication module 258 is programmed to control communication through the antenna 262 including processing data embodied in signals received through the antenna 262 and preparing data to be transmitted to remote devices through the antenna 262. Communication can be according to any wireless transmission techniques including standards such as Bluetooth, cellular standards (e.g., CDMA, GPRS, GSM, 2.5G, 3G, 3.5G, 4G), WiGig, IEEE 802.11a/b/g/n/ac, IEEE 802.16 (e.g., WiMax). The NIC 248 also can provide wired communication between the controller 104 and remote devices through wired connections using any suitable port and connector for transmitting data and according to any suitable standards such as RS 232, USB, FireWire, Ethernet, MIDI, eSATA, or thunderbolt.

Figure 5:
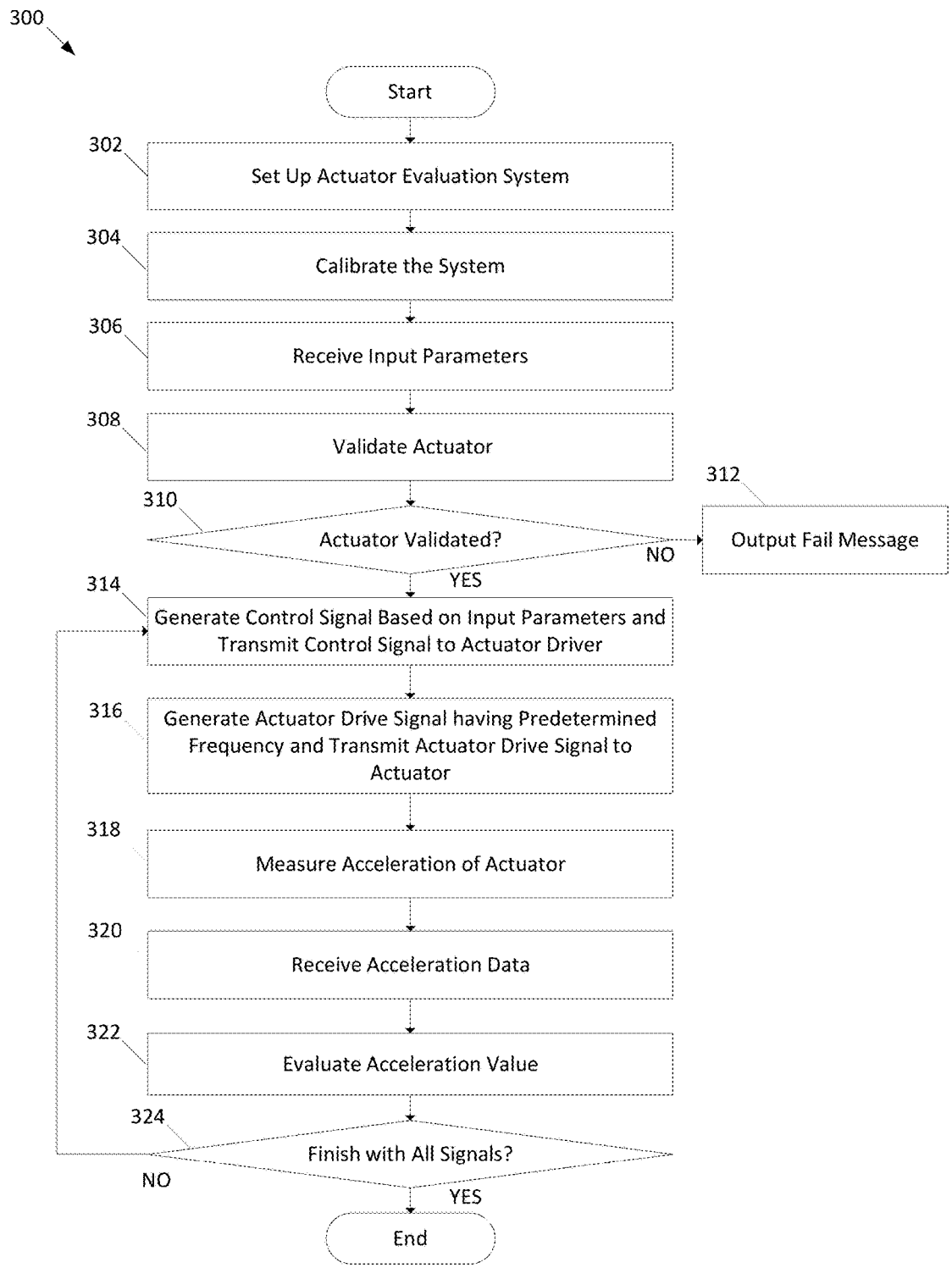
FIG. 5 is a flowchart illustrating a method for evaluating an actuator in one of many possible embodiments of the present disclosure.

FIG. 5 is a flowchart illustrating a method 300 for evaluating an actuator in one of many possible embodiments of the present disclosure. The method herein is described in relation to the actuator evaluation system 200 of FIG. 3 and/or the actuator analyze device 202 of FIG. 4. However, the method may be implemented in a variety of systems other than those shown in FIGS. 3 and 4. For brevity, the method 300 is described with respect to a single actuator 110 under evaluation. However, it is noted that the method 300 can be similarly implemented with respect to a plurality of actuators 110 connected to the system 200 for evaluation together.

The method 300 begins at operation 302, in which the actuator evaluation system 200 is set up by connecting an actuator 110 to the actuator drive and data acquisition circuit 204. The actuator 110 can be wired to the circuit 204, or wirelessly coupled to the circuit 204.

At operation 304, the system 200 is calibrated for accurate measurement and evaluation. For example, a sensor 206, such as accelerometers, can be calibrated for one or more characteristics, such as sensitivity, frequency response, resonant frequency, amplitude linearity, transverse sensitivity, temperature response, time constant, capacitance, and the other environmental effects. Other electrical components in the system 200 can also be calibrated.

At operation 306, the system 200 operates to receive input parameters for the actuator 110 under evaluation. In one embodiment, this operation can be performed by the user input acquisition module 252 as described in FIG. 4. Examples of such input parameters are described with reference to FIG. 6.

At operation 308, the system 200 operates to validate the actuator 110 connected to the system 200 for evaluation. In one possible embodiment, the system 200 applies a voltage signal to the actuator 110 and monitors a feedback, such as a current signal, from the actuator 110 to verify the presence and connection of the actuator. Such a voltage signal is low enough to protect the actuator from overshooting. The validation process is performed to ensure that the actuator does not overload the system with short circuit or create an open circuit situation.

At operation 310, the system 200 determines whether the actuator 110 is validated. If the actuator is determined to be validated ("YES" at this operation), the method continues on at operation 314. If not validated ("NO" at this operation), the system 200 outputs a fail message (operation 312). In one embodiment, the fail message includes details about the actuator and the reason that the actuator is not validated. In at least one embodiment, if the actuator is not validated, the system 200 can terminate the evaluation process. In other embodiments, if the actuator is not validated, the system 200 can operate to wait for, and receive, a user input or action for a subsequent process. For example, once the fail message is presented to the user, the system 200 allows the user to replace the actuator that has not been validated with another actuator for testing or evaluation. The system can then wait to receive input parameters at operator 306. Alternatively, the system uses the input parameters previously entered for the failed actuator and automatically validates the new actuator at operation 308.

At operation 314, the system 200 generates a control signal based on the input parameters and applies the control signal to the actuator driver 214 to control the actuator driver 214.

At operation 316, the system 200 generates a drive signal having a predetermined frequency and applies the drive signal to the actuator 110 to drive the actuator 110. In the specific embodiments described herein, the drive signal is configured to be in a steady state to better evaluate a braking response.

As described herein, the drive signal may include an actuator drive signal and an actuator braking signal. In one embodiment, the actuator drive signal is applied to the actuator to activate the actuator 110 for a predetermined amount of time, and the actuator brake signal is then applied to the actuator 110 to decelerate the actuator 110.

In one embodiment, an actuator braking signal is configured to be out of phase to an actuator drive signal. For example, the actuator braking signal is approximately 180 degrees out of phase with the actuator drive signal. In one possible embodiment, the actuator braking signal is generated by inverting the actuator drive signal. In another possible embodiment, the actuator braking signal is generated by shifting the phase of the actuator drive signal by an amount other than 180 degrees. For example, the signal is inverted or shifted 180 degrees out of phase when the phase is changed at zero-crossings where the amplitude of the signal is substantially zero. In yet other possible embodiments, the actuator braking signal is generated by changing the frequency of the actuator drive signal. For example, the frequency of the actuator drive signal is doubled for one or more cycles and is returned to the original frequency so that the phase is inverted. In yet other embodiments, the actuator braking signal is generated by stopping the actuator drive signal for a predetermined time before resuming. For example, the actuator drive signal can be stopped for a half cycle and then generated so that the resumed signal is out of phase to the original actuator drive signal.

In some possible embodiments, the actuator braking signal has the same frequency as the actuator drive signal. In other embodiments, the actuator braking signal has a frequency different from the actuator drive signal. In some possible embodiments, the actuator braking signal has the same amplitude as the actuator drive signal. In other embodiments, the actuator braking signal has amplitude different from the actuator drive signal. In one possible embodiment, the actuator braking signal has amplitude greater than the actuator drive signal to provide quicker or more abrupt braking of the actuator. In other possible embodiments, the amplitude of the actuator braking signal is smaller than the one of the actuator drive signal to generate more gradual braking effect.

At operation 318, the system 200 measures acceleration of the actuator 110 using, for example, the sensor 206 associated with the actuator 110. The sensor 206 generates a data signal containing information about the acceleration data.

At operation 320, the system 200 receives the acceleration data via the data signal from the sensor 206.

At operation 322, the system 200 evaluates the acceleration data to determine an optimal braking frequency that provides a predetermined braking characteristic of the actuator 110. In one embodiment, the predetermined braking characteristic is representative of an acceleration value of the actuator that is below a threshold value. Such an acceleration value lower than the threshold value can indicate that the actuator stops as quickly as desired. In other embodiments, the optimal braking frequency is a frequency that produces the minimal acceleration value of the actuator.

At operation 324, the system 200 determines whether the evaluation has been performed with each of the drive signals that are to be generated based on the input parameters. In one possible embodiment, each drive signal has a frequency different from the other drive signals. If it is determined that there is at least one drive signal that needs to be applied to the actuator for evaluation ("NO" at this operation), the method 300 returns to the operation 314 and repeats the subsequent operations. If no drive signal is left ("YES" at this operation), the method 300 ends and the evaluation is terminated. In this way, the evaluation process can be repeated with different drive signals having different frequencies, until the optimal braking frequency is identified.

In the specific embodiments disclosed herein, multiple drive signals with different frequencies are applied to the actuator in sequence, and the braking performance of the actuator is monitored by the sensor (e.g., accelerometer) and evaluated for each of the drive signals. In one possible embodiment, the sensor can monitor the movement of the actuator to ensure that the actuator has completely stopped between applications of different drive signals.

Figure 6:
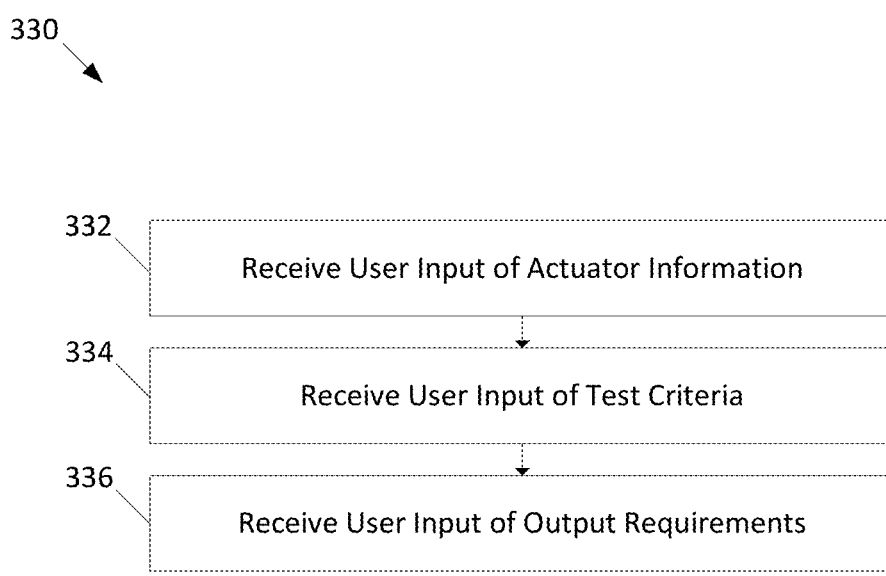
FIG. 6 is a flowchart illustrating a method for receiving input parameters that the system can use to evaluate an actuator.

FIG. 6 is a flowchart illustrating a method 330 for receiving input parameters that the system 200 can use to evaluate an actuator 110. In one embodiment, this operation can be performed by the user input acquisition module 252 as described in FIG. 4. However, the method may be implemented in a variety of systems other than the user input acquisition module 252.

At operation 332, the module 252 operates to receive user input of actuator information. The actuator information can include information obtained from a specification of the actuator 110. Examples of such actuator information include physical specification, leads and connectors specification, operational specification, typical performance characteristics, typical haptic characteristics, and environmental characteristics. The physical specification includes various physical parameters of the actuator, such as dimension and weight. The leads and connectors specification includes parameters of various connection elements of the actuator, such as lead length, lead strip length, lead wire gauge, and lead configuration. The operational specification includes various operational parameters, such as rated voltage, rated resonant frequency (e.g., at rated voltage with the inertial test load), maximum rated operating current (e.g., at rated voltage using the inertial test load), rated inertial test load (e.g., mass of standard test sled), maximum start voltage (e.g., with the inertial test load), minimum vibration amplitude (e.g., peak-to-peak value at rated voltage using the inertial test load), maximum operating voltage, and minimum insulation resistance. The typical performance characteristics include various typical performance parameters, such as typical rated operating current (e.g., at rated voltage using the inertial test load), typical vibration amplitude (e.g., peak-to-peak value at rated voltage using the inertial test load), typical vibration efficiency (e.g., at rated voltage using the inertial test load), typical normalized amplitude (e.g., peak-to-peak vibration amplitude normalized by the inertial test load at rated voltage), typical start voltage (e.g., with the inertial test load), and typical terminal resistance, and typical terminal inductance. The typical haptic characteristics include haptic effect parameters, such as typical lag time (e.g., at rated voltage using the inertial test load), typical rise time (e.g., at rated voltage using the inertial test load), and typical stop time (e.g., at rated voltage using the inertial test load). The environmental characteristics includes parameters of operational environment, such as maximum operating temperature, minimum operating temperature, maximum storage and transportation temperature, and minimum storage and transportation temperature.

At operation 334, the module 252 operates to receive user input of test criteria. The test criteria can include information that defines the aspect and scope of the evaluation of the actuator. Examples of such test criteria include rated drive voltage, rated drive time, over drive voltage, over drive time, braking voltage, braking time, fall time threshold, test frequency bandwidth, frequency step size, and test duration. An example interface of the input device 232 for receiving the user input of test criteria is described in more detail with reference to FIGS. 9-12.

At operation 336, the module 252 operates to receive user input of output requirements. The output requirements can define the information that is outputted via the output device 234. In some embodiments, the output requirements can determine what information of the evaluation result will be displayed and how the result is displayed via the output device 234, such as a display screen. Examples of the evaluation result are illustrated in more detail with reference to FIGS. 13-20.

Figure 7:
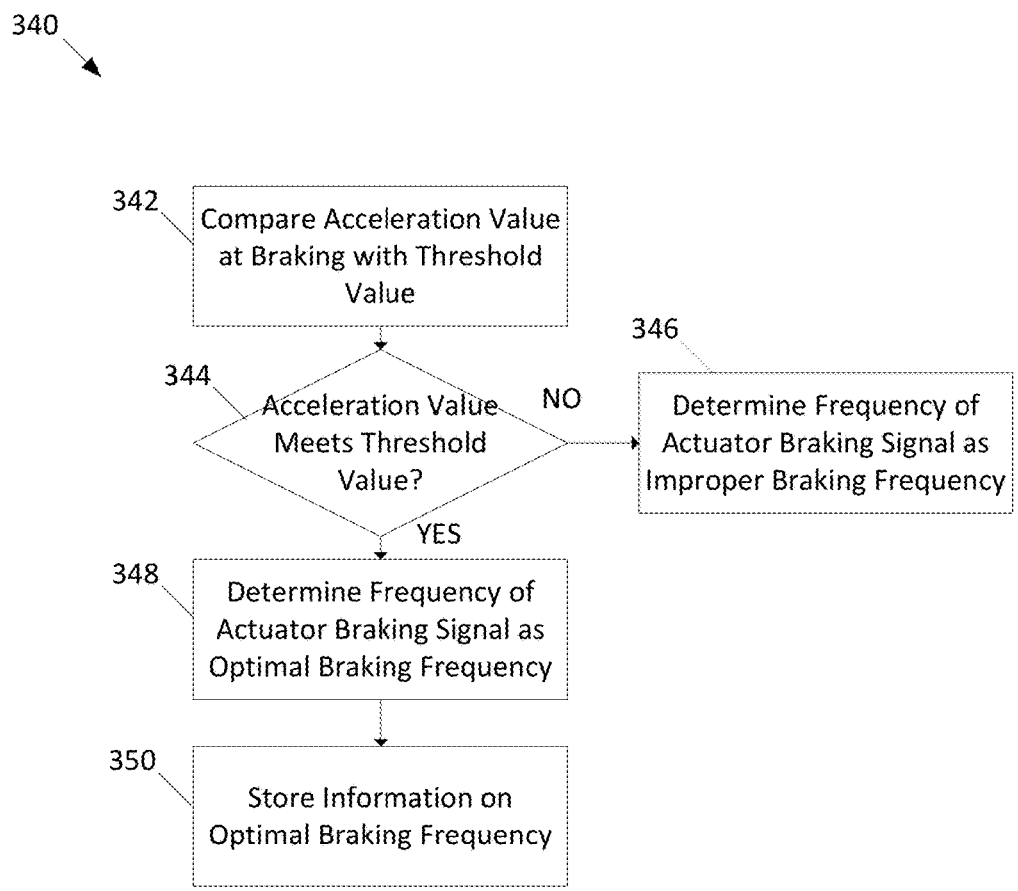
FIG. 7 is a flowchart illustrating an example method for analyzing the data from the sensor to determine an optimal braking frequency.

FIG. 7 is a flowchart illustrating an example method 340 for analyzing the data from the sensor 206 to determine an optimal braking frequency. In one embodiment, this operation can be performed by the braking frequency detection module 256 as described in FIG. 4. However, the method may be implemented in a variety of systems other than the braking frequency detection module 256.

Figure 8:
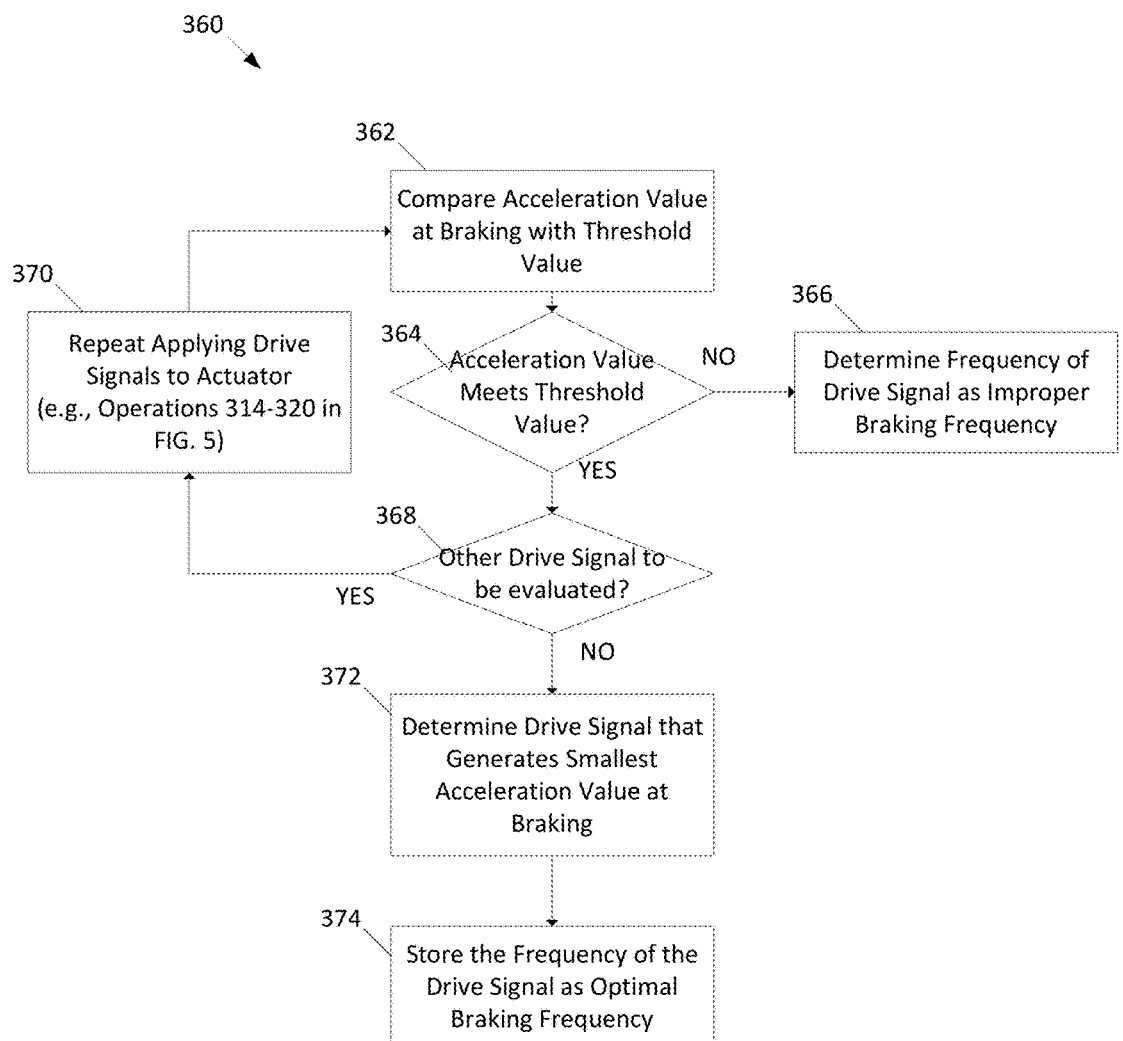
FIG. 8 is a flowchart illustrating another example method for analyzing the data from the sensor to determine an optimal braking frequency.

At operation 342, the module 256 compares an acceleration value of the actuator with a threshold value. The acceleration value is selected from the acceleration data of the actuator and includes an acceleration value at a time of braking the actuator. In one possible embodiment, the acceleration value is selected to be the minimum acceleration value from the acceleration data after a time of applying the actuator braking signal to the actuator. In another possible embodiment, the acceleration value is selected to be an acceleration value when the actuator decelerates in response to the actuator braking signal. In yet another possible embodiment, the acceleration value is selected to be an acceleration value at a time the actuator is decelerated. In the other possible embodiments, the acceleration value is set as a valley point as illustrated in FIG. 8.

The threshold value can be determined by a manufacturer or user to represent an acceleration value that demonstrates a predetermined braking characteristic of the actuator.

At operation 344, the module 256 determines whether the acceleration value at the braking meets the threshold value. If it is determined that the acceleration value at the braking meets the threshold value ("YES" at this operation), the method continues at operation 348. Otherwise ("NO" at this operation), the module 256 determines that the frequency of the actuator braking signal that has been applied to the actuator is not an optimal braking frequency (operation 346).

When the frequency of the actuator braking signal is not determined to be an optimal braking frequency (operation 346), the system 200 can be configured to perform different operations in different applications. In at least one exemplary embodiment, if the frequency of the actuator braking signal is determined as an improper braking frequency, the system 200 can terminate the analysis process. In other embodiments, if the frequency of the actuator braking signal is determined as an improper braking frequency, the system 200 can operate to wait for, and receive, a user input for adjusting at least one of the characteristics of the actuator braking signal or a user input of a new actuator braking signal, so that the adjusted or new actuator braking signal can have an optimal braking frequency. The system can return and perform operation 342 and subsequent operations with the adjusted or new actuator braking signal. In yet other embodiments, the system 200 can allow the user to replace the associated actuator with another actuator for testing or evaluation.

In one possible embodiment, the module 256 can determine whether the acceleration value at the braking is lower than the threshold value.

At operation 348, when determining that the acceleration value at the braking meets the threshold value, the module 256 determines that the frequency of the actuator braking signal that has been applied to the actuator is considered to be an optimal braking frequency.

At operation 350, the module 256 stores the frequency of the actuator braking signal applied to the actuator as an optimal braking frequency.

FIG. 8 is a flowchart illustrating another example method 360 for analyzing the data from the sensor 206 to determine an optimal braking frequency. In one embodiment, this operation can be performed by the braking frequency detection module 256 as described in FIG. 4. However, the method may be implemented in a variety of systems other than the braking frequency detection module 256.

Figure 9:
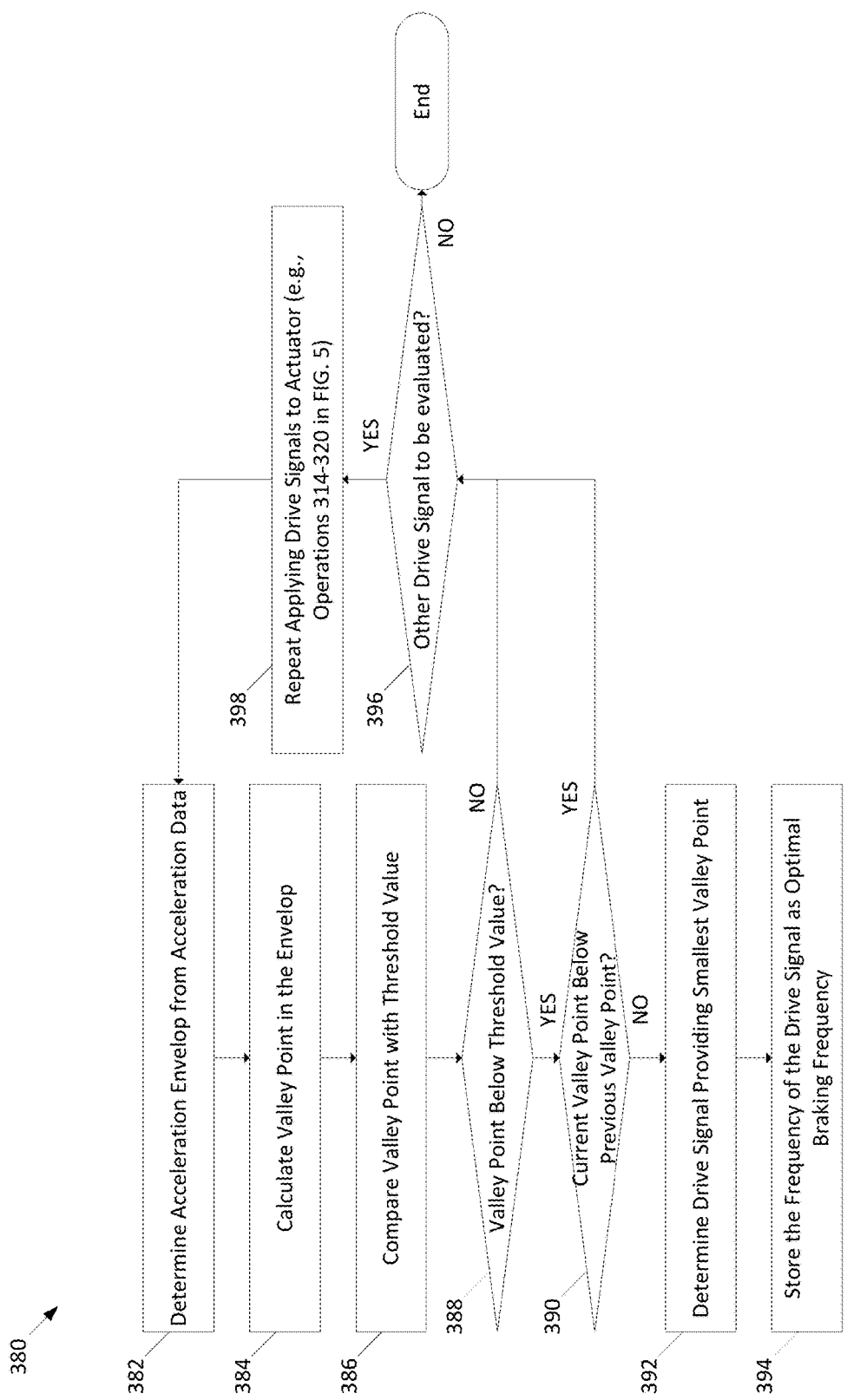
FIG. 9 is a flowchart illustrating yet another example method for analyzing the data from the sensor to determine an optimal braking frequency.

At operation 362, the module 256 compares an acceleration value of the actuator with a threshold value. The acceleration value is selected from the acceleration data of the actuator and includes an acceleration value at a time of braking the actuator. In one possible embodiment, the acceleration value is selected to be the minimum acceleration value from the acceleration data after a time of applying the actuator braking signal to the actuator. In another possible embodiment, the acceleration value is selected to be an acceleration value when the actuator decelerates in response to the actuator braking signal. In yet another possible embodiment, the acceleration value is selected to be an acceleration value at a time the actuator is decelerated. In the other possible embodiments, the acceleration value is set as a valley point as illustrated in FIG. 9. The threshold value can be determined by a manufacturer or user to represent an acceleration value that demonstrates a predetermined braking characteristic of the actuator.

At operation 364, the module 256 determines whether the acceleration value at the braking meets the threshold value. If it is determined that the acceleration value at the braking meets the threshold value ("YES" at this operation), the method continues at operation 368. Otherwise ("NO" at this operation), the module 256 determines that the frequency of the actuator braking signal that has been applied to the actuator is not an optimal braking frequency (operation 366). In one possible embodiment, the module 256 can determine whether the acceleration value at the braking is lower than the threshold value.

When the frequency of the actuator braking signal is not determined to be an optimal braking frequency (operation 366), the system 200 can be configured to perform different operations in different applications. In at least one exemplary embodiment, if the frequency of the actuator braking signal is determined as an improper braking frequency, the system 200 can terminate the analysis process. In other embodiments, if the frequency of the actuator braking signal is determined as an improper braking frequency, the system 200 can operate to wait for, and receive, a user input for adjusting at least one of the characteristics of the actuator braking signal or a user input of a new actuator braking signal, so that the adjusted or new actuator braking signal can have an optimal braking frequency. The system can return and perform operation 362 and subsequent operations with the adjusted or new actuator braking signal. In yet other embodiments, the system 200 can allow the user to replace the associated actuator with another actuator for testing or evaluation.

At operation 368, it is determined whether there is at least one drive signal to be applied to the actuator for evaluation. If so ("YES" at this operation), the method moves on to operation 370, in which a subsequent one of the drive signals with different frequencies is applied to the actuator and the acceleration data is obtained therefrom. This is similar to repeating the operations 314-320 as described in FIG. 5.

If it is determined that all of the drive signals have been applied to the actuator and evaluated ("NO" at operation 368), the method continues at operation 372, in which the module 256 determines the drive signal that has generated the smallest acceleration value at braking.

At operation 374, the module 256 stores the frequency of the determined drive signal as an optimal braking frequency for the actuator. In addition, the smallest acceleration value can also be stored. The frequency and the smallest acceleration value can be retrieved and used for various operations. By way of example, the stored information about the frequency and the smallest acceleration value can be used for setting up or configuring the actuator in applications, for determining an optimal braking frequency of other actuators, or for manufacturing actuators.

FIG. 9 is a flowchart illustrating another example method 380 for analyzing the data from the sensor 206 to determine an optimal braking frequency. In one embodiment, this operation can be performed by the braking frequency detection module 256 as described in FIG. 4. However, the method may be implemented in a variety of systems other than the braking frequency detection module 256. The method 380 is described with reference to FIGS. 14-19.

Figure 17:
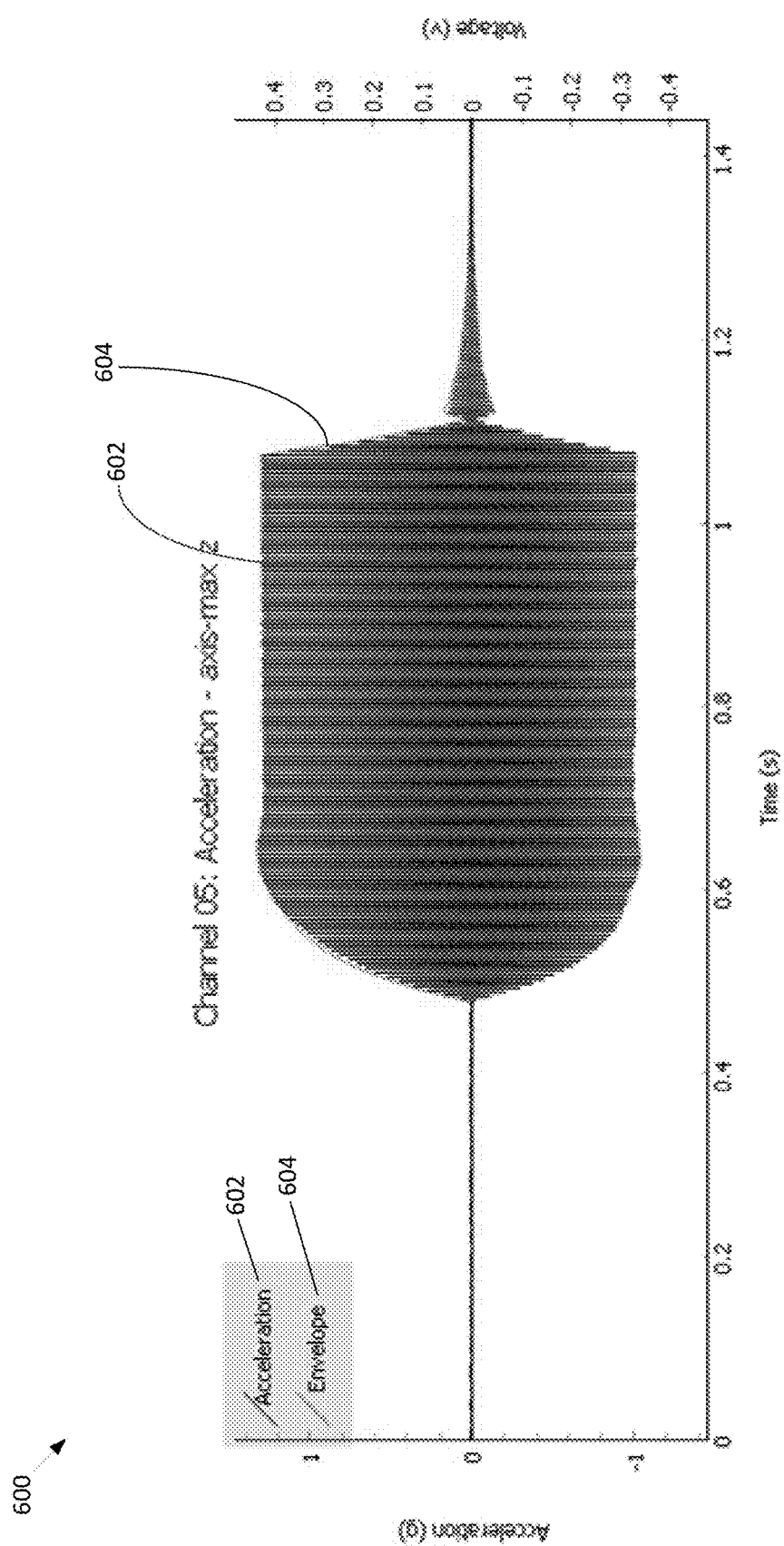
FIG. 17 illustrates an example acceleration output profile and an acceleration envelope overlaid.
Figure 18:
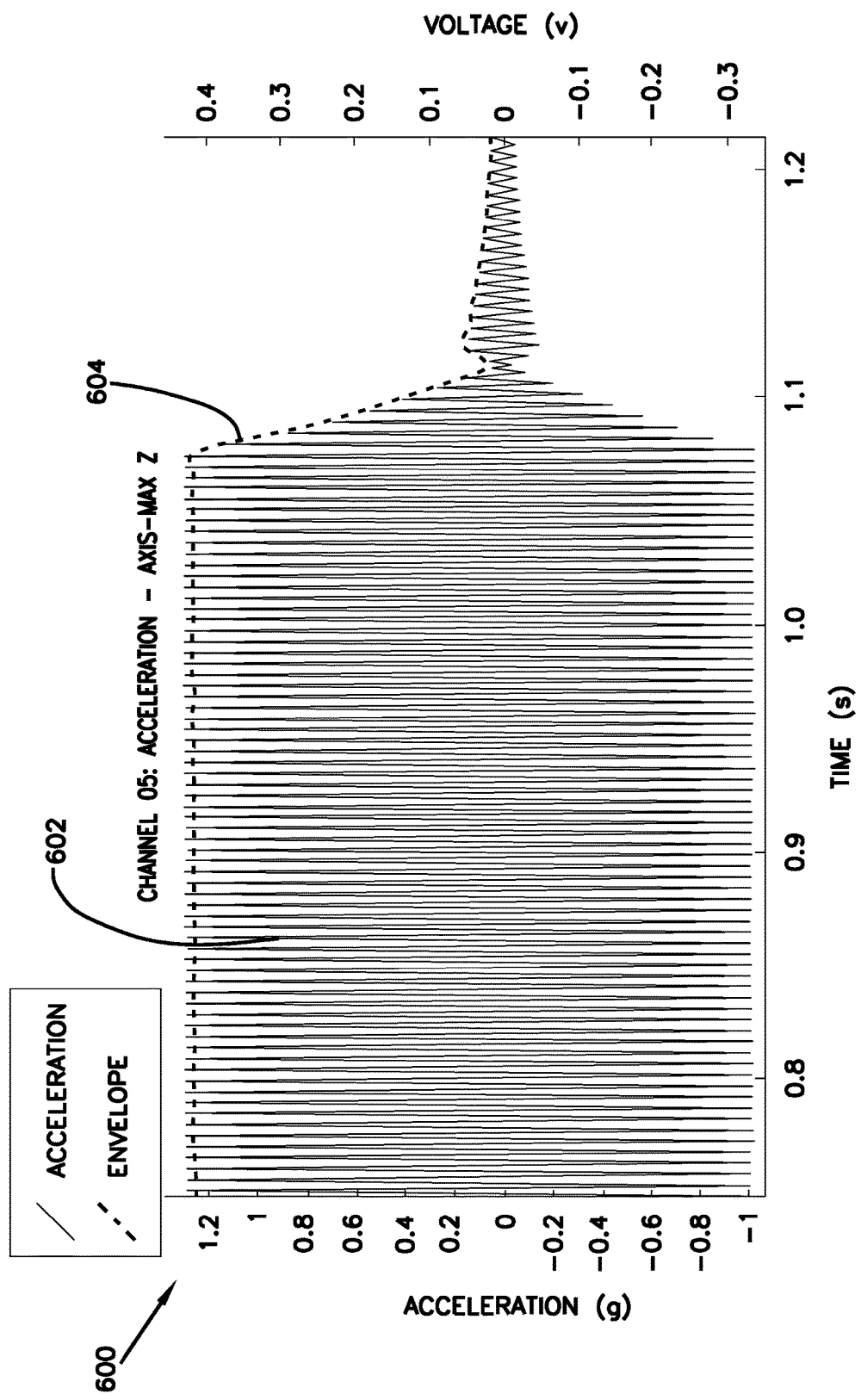
FIG. 18 is an expanded view of FIG. 17.

At operation 382, when receiving the acceleration data of the actuator 110, the module 256 determines an acceleration envelope from the acceleration data. For example, as illustrated in FIGS. 17 and 18, when an oscillating drive signal 502 (FIGS. 14-16) with a particular frequency is applied to the actuator, the acceleration or movement of the actuator is generated in the form of an oscillating wave. As shown in FIGS. 17 and 18, on the acceleration profile output 600 of the actuator, the module 256 determines an envelope 604 that outfits the extremes of the oscillating acceleration output signal 602. The acceleration envelope 604 is separately illustrated in FIG. 19 without other signals overlaid.

Figure 19:
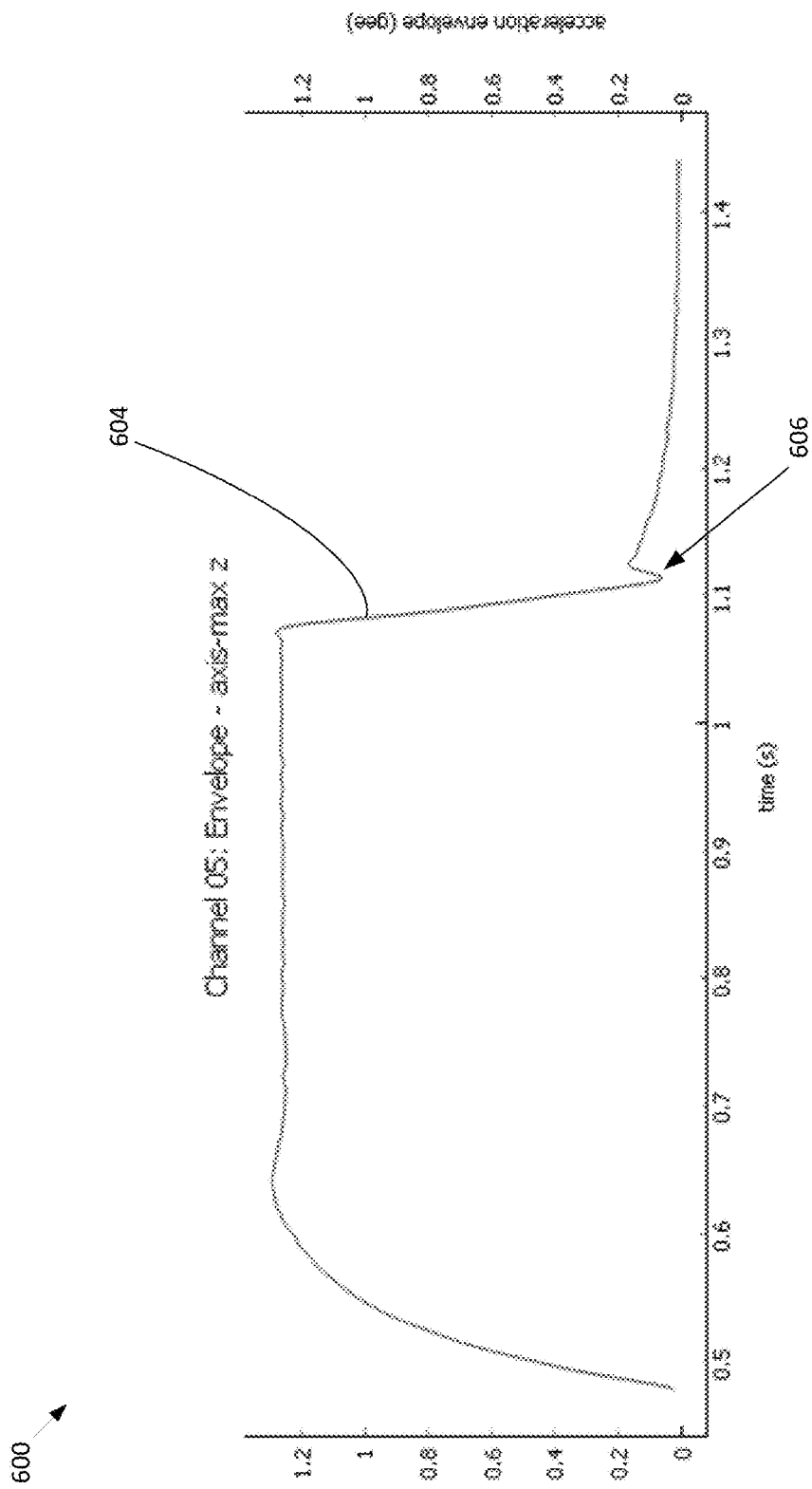
FIG. 19 illustrates the acceleration envelope of FIG. 17 without other profiles or signals overlaid.

At operation 384, the module 256 calculates a valley point on the acceleration envelope. The valley point can be defined as a point having the minimum acceleration value. In one possible embodiment, as shown in FIG. 19, the module 256 can determine the smallest acceleration value point on the envelope 604 and set the smallest acceleration value point as a valley point 606. In other possible embodiments, a point with an acceleration value other than the minimum acceleration value can be set as a valley point. For example, the valley point 606 can be a point adjacent the minimum acceleration value point.

At operation 386, the module 256 compares the valley point 606 with a threshold value. The threshold value is determined as described herein.

At operation 388, if it is determined that the valley point 606 is below the threshold value ("YES" at this operation), the method continues at operation 390. Otherwise ("NO" at this operation), the method moves on to operation 396.

At operation 390, the module 256 determines whether the current valley point 606 is below the previous valley point that was obtained with respect to the previous drive signal applied to the actuator. If it is determined that the current value point is below the previous valley point ("YES" at this operation), the method moves on to operation 396. Otherwise ("NO" at this operation), the method continues at operation 392. At operation 392, the module 256 determines the drive signal that has provided the smallest valley point. Then, at operation 394, the module 256 stores the frequency of the determined drive signal as an optimal braking frequency for the actuator.

At operation 396, the module 256 determines whether there is at least one drive signal to be applied to the actuator for evaluation. If so ("YES" at this operation), the method moves on to operation 398, in which a subsequent one of the drive signals with different frequencies is applied to the actuator and the acceleration data is obtained therefrom. This is similar to repeating the operations 314-320 as described in FIG. 5. When determining that there is no drive signal to be applied to the actuator for evaluation, the method can be terminated.

If it is not determined that the current value point is below the previous valley point ("NO" at this operation), the module 256 determines the drive signal that has generated the smallest valley point (at operation 392). Then, at operation 394, the module 256 stores the frequency of the determined drive signal as an optimal braking frequency for the actuator.

Referring to FIGS. 10-13, the user interface 212 is described in more detail in accordance with one of many possible embodiments of the present disclosure. The user interface 212 allows a user to input parameters usable to evaluate an actuator. Such parameters are described in FIG. 6 above and in FIGS. 10-13 below.

Figure 10:
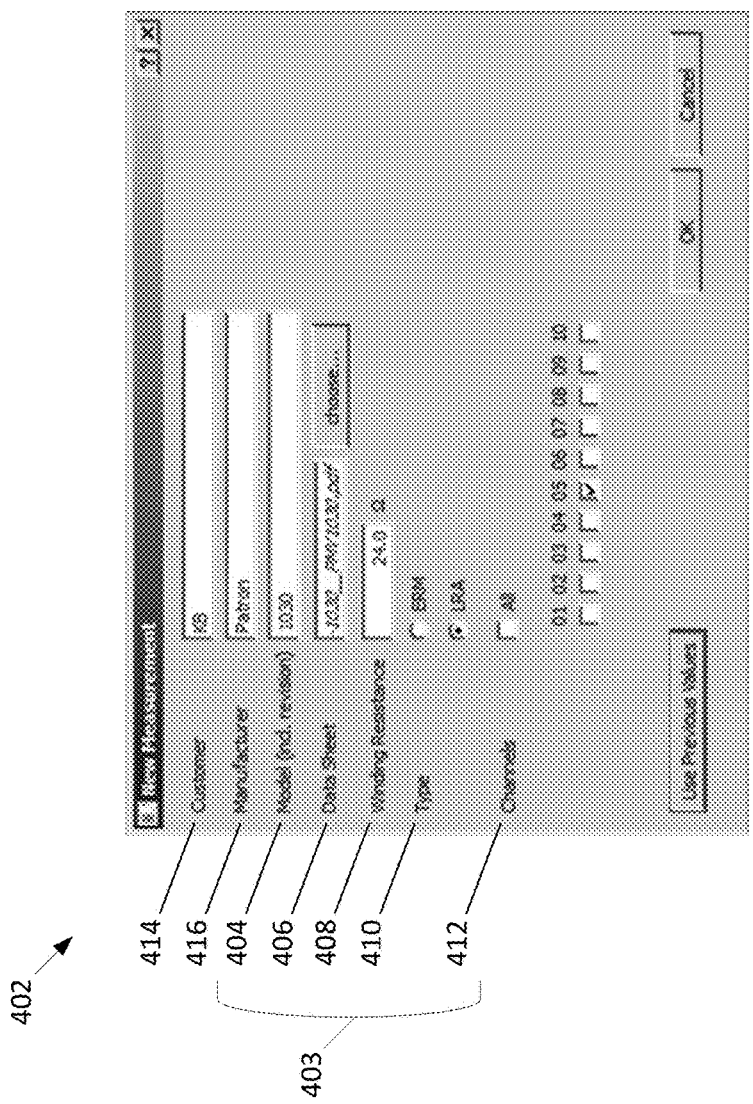
FIG. 10 is an example user interface for receiving actuator information.

FIG. 10 is an example user interface 402 for receiving actuator information 403. As depicted, the user interface 402 can allow a user to identify a model number 404, upload the data sheet for an actuator 406, enter a winding resistance 408, select type of the actuator 410, and select a channel to which the actuator is connected 412. In addition, the user interface 402 permits a user to enter other pieces of information, such as customer information 414 and manufacturer information 416.

Figure 11:
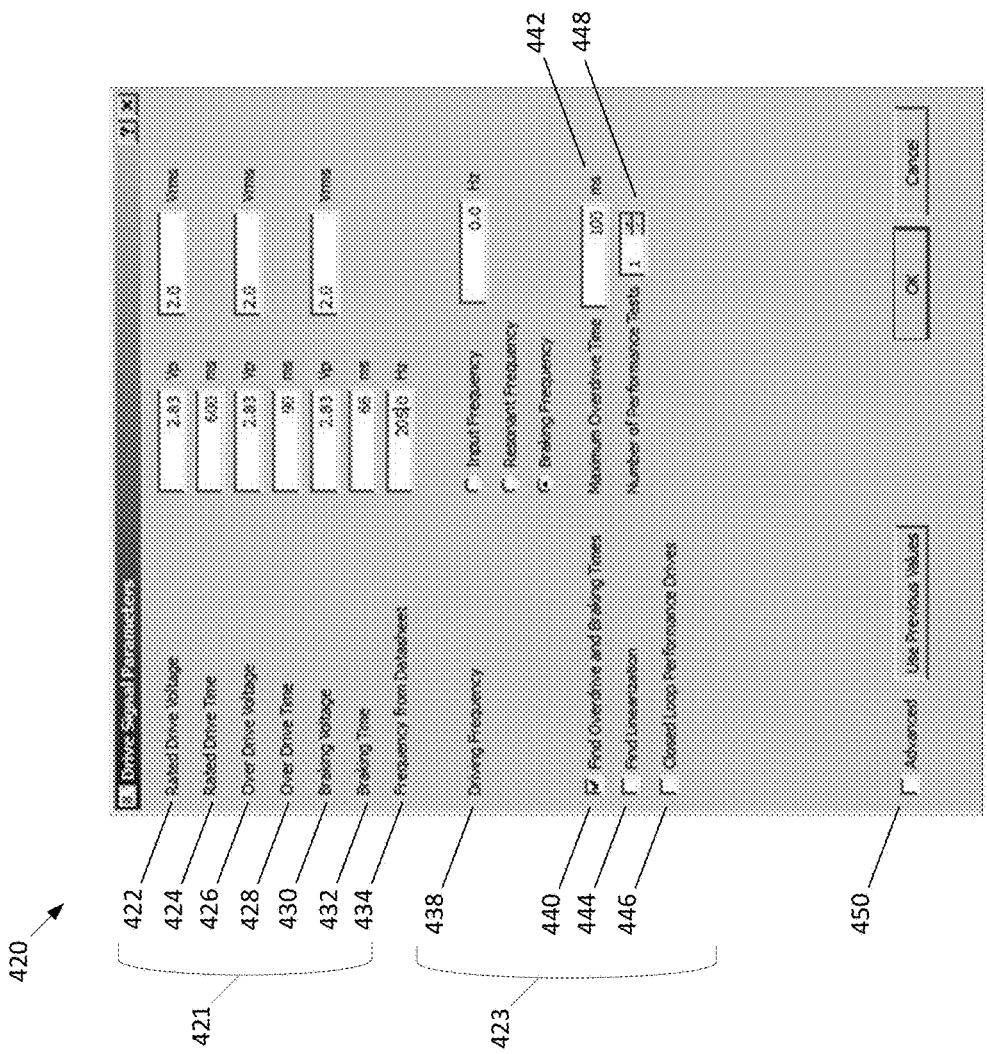
FIG. 11 is an example user interface for receiving test criteria and output requirements.

FIG. 11 is an example user interface 420 for receiving test criteria 421 and output requirements 423. As depicted, the user interface 420 enables a user to define various test criteria 421, such as rated drive voltage 422, rated drive time 424, over drive voltage 426, over drive time 428, braking voltage 430, and braking time 432. The frequency 434 can be manually or automatically obtained from the datasheet. In addition, the user interface 420 can receive other parameters, such as fall time threshold, test frequency bandwidth, frequency step size, and test duration.

The user interface 420 is further configured to receive output requirements 423, such as a frequency to be detected 438 (e.g., an input frequency, a resonant frequency, or a braking frequency). In addition, a user can select several options, such as whether to find override and braking times 440, whether to find linearization 444, and whether to perform closed loop performance drives 446. The user can also define a maximum override time 442 and select the number of performance tests 448.

Figure 12:
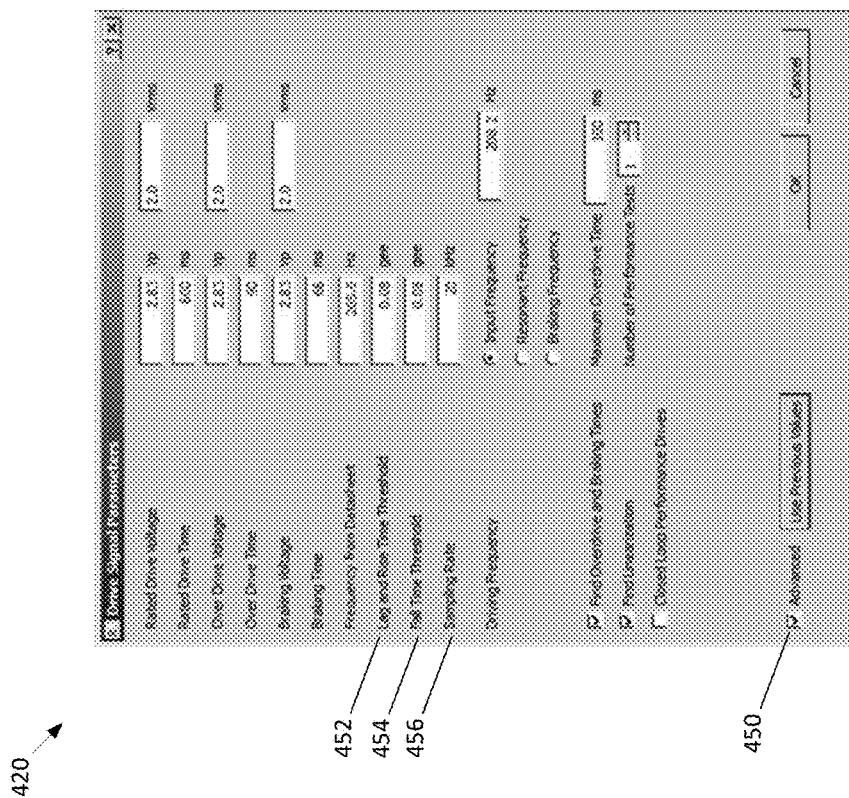
FIG. 12 illustrates the user interface of FIG. 11 when an advanced option is selected.

FIG. 12 illustrates the user interface 420 of FIG. 11 when an advanced option 450 is selected. When the advanced option 450 is chosen, a user can input additional parameters for testing, such as lag and rise time threshold 452, fall time (i.e., valley point) threshold 454, and sampling rate 456.

Figure 13:
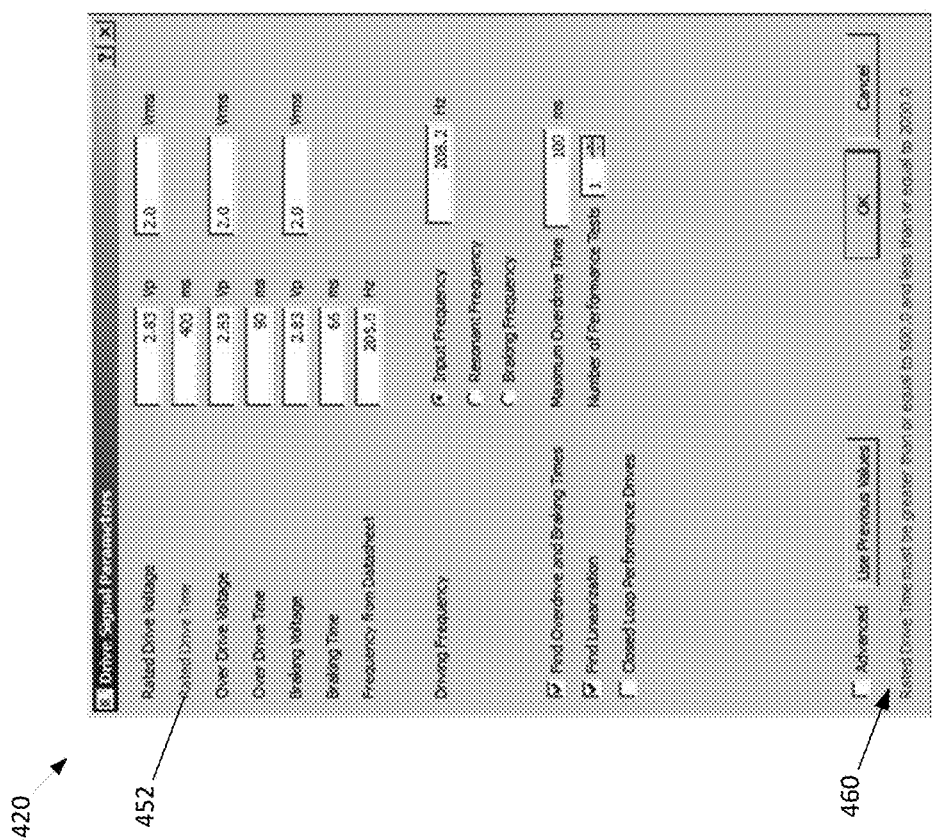
FIG. 13 illustrates the user interface of FIG. 11 when a user attempts to input a value outside a predetermined range.

FIG. 13 illustrates the user interface 420 of FIG. 11 when a user attempts to input a value outside a predetermined range. In some embodiments, some of the test parameters, such as drive signal parameters, can be configured not to be fully controlled by an end user of the system. By way of example, as illustrated in FIG. 11, the rated drive time 424 can be limited by a range of selectable values to protect the actuator connected to the system. Therefore, a user can only enter a value falling within the range. When a user attempts to enter a number (e.g., 400 ms in FIG. 13) outside the range (e.g., between 500 ms and 2000 ms), the user interface 420 rejects the number and issues a message 460 to alert the user.

Referring to FIGS. 14-17, the results of evaluation of an actuator with different drive signals with different frequencies are described for illustrative purposes.

In the illustrated embodiments, drive signals have sinusoidal waveform. In other embodiments, however, drive signals can have other waveforms, such as direct current signals, square waves, step signals, triangle waves, saw tooth waves, other forms of alternating signals, composite waveforms, signals with a biased or DC offset, and pulses.

FIG. 14 illustrates an example result of applying a drive signal 502 to an actuator. The drive signal 502 has a first frequency (e.g., 207.5 Hz). In response to the drive signal 502, the actuator moves as depicted in an acceleration profile 504. As depicted, the drive signal 502 has an actuator braking signal 514 applied at a braking time 516. The acceleration profile 504 illustrates that the actuator decelerates in response to the braking signal 514 shortly after the braking time 516. In this profile 504, an acceleration value 518 at the braking can be considered to be desirable, and therefore the first frequency of the drive signal 502 can be regarded as an optimal braking frequency.

FIG. 15 illustrates another example result of applying a drive signal 502 to an actuator. The drive signal 502 has a second frequency (e.g., 204.9 Hz). The acceleration profile 504 illustrates that the actuator decelerates in response to the braking signal 514 shortly after the braking time 516. However, in this profile 504, an acceleration value 518 at the braking is less desirable than in FIG. 14, and therefore the second frequency of the drive signal 502 is less likely to be regarded as an optimal braking frequency.

FIG. 16 illustrates yet another example result of applying a drive signal 502 to an actuator. The drive signal 502 has a third frequency (e.g., 208.5 Hz). The acceleration profile 504 illustrates that the actuator decelerates in response to the braking signal 514 shortly after the braking time 516. However, in this profile 504, an acceleration value 518 at the braking is less desirable than in FIGS. 14 and 15, and therefore the third frequency of the drive signal 502 is much less likely to be regarded as an optimal braking frequency.

Referring to FIGS. 17-19, example acceleration profile outputs are illustrated when using optimal braking frequency. FIG. 17 illustrates an example acceleration output profile 602 and an acceleration envelope 604 overlaid, and FIG. 18 is an expanded view of FIG. 17. FIG. 19 illustrates only the acceleration envelope 604 without other profiles or signals overlaid. As described herein, the acceleration envelope 604 is a plot that outfits the extremes of the acceleration output signal 602, and is used to determine a valley point 606 which is used to determine an optimal braking frequency as described herein.

The system of the present disclosure can be used to detect an optimal braking frequency in various stages. In one possible embodiment, manufacturers of haptic enabled devices can use the system to determine an optimal braking frequency for a desired braking characteristic during manufacturing of the haptic enabled devices. In another possible embodiment, an optimal braking frequency can be detected when a haptic enabled device is first operated (i.e., during start-up or boot time). In yet another possible embodiment, an optimal braking frequency can be detected by monitoring the braking performance of an actuator in the haptic enabled device during the operation of the haptic enabled device. By monitoring the haptic enabled device during its run time, the optimal braking frequency can be detected and updated as the performance or characteristics of the actuator changes over time.

The system and method of the present disclosure may be used to detect other characteristics of haptic actuators for improved haptic effects. In one possible embodiment, the system of the present disclosure can be used to detect an optimal resonant frequency of a drive signal that causes an actuator to reduce a rise time. In another possible embodiment, the system is configured to detect an optimal amplitude for a desired braking performance.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for providing a desired haptic effect, the method comprising:
applying a first drive signal to an actuator;
applying a first braking signal to the actuator, the first braking signal having a first frequency and being out of phase to the first drive signal;
obtaining first acceleration data of the actuator in response to the first drive signal and the first braking signal;
determining a first acceleration value, from the first acceleration data, at a time of braking the actuator;
determining whether the first acceleration value meets a threshold value, the threshold value representative of an acceleration value for a predetermined braking characteristic; and
applying a braking signal having the first frequency to the actuator to generate the desired haptic effect according to the predetermined braking character.

2. The method of claim 1, further comprising:
in response to determining that the first acceleration value meets the threshold value, storing the first frequency as an optimal braking frequency for the actuator.

3. The method of claim 1, wherein the first acceleration value is the minimum acceleration value from the first acceleration data after a time of applying the first braking signal to the actuator.

4. The method of claim 1, wherein the first drive signal has the first frequency.

5. The method of claim 1, wherein applying a first braking signal comprises generating the first braking signal by shifting the phase of the first drive signal.

6. The method of claim 1, wherein the first braking signal has a phase 180 degrees out of phase to the first drive signal.

7. The method of claim 1, wherein the first braking signal has the same amplitude as the first drive signal.

8. The method of claim 1, wherein the first braking signal has amplitude different from the first drive signal.

9. The method of claim 1, wherein determining a first acceleration value comprises determining a first acceleration value, from the first acceleration data, when the actuator decelerates in response to the first braking signal.

10. The method of claim 1, wherein determining a first acceleration value comprises determining a first acceleration value, from the first acceleration data, at a time the actuator is decelerated.

11. The method of claim 1, further comprising:
repeating the steps of applying a first drive signal, applying a first braking signal, obtaining first acceleration data, determining a first acceleration value, and determining whether the first acceleration value meets a threshold value;
determining the smallest value of the first acceleration values that meet the threshold value; and
storing a frequency corresponding to the smallest value as an optimal braking frequency for the actuator.

12. The method of claim 1, further comprising:
applying a second drive signal to the actuator to drive the actuator;
applying a second braking signal to the actuator, the second braking signal having a second frequency different from the first frequency and being out of phase to the second drive signal;
obtaining second acceleration data of the actuator in response to the second drive signal and the second braking signal;
determining a second acceleration value, from the second acceleration data, at a time of braking the actuator;
determining whether the second acceleration value meets the threshold value;
determining whether the second acceleration value is smaller than the first acceleration value; and
in response to determining that the second acceleration value is smaller than the first acceleration value, storing the second frequency as an optimal braking frequency for the actuator.

13. The method of claim 1, wherein determining a first acceleration value comprises:
determining an acceleration envelop from the first acceleration data; and
calculating a valley point in the envelop.

14. The method of claim 13, wherein determining whether the first acceleration value meets a threshold value comprises:
determining the valley point is smaller than the threshold value.

15. The method of claim 14, further comprising:
in response to determining that the valley point is smaller than the threshold value, storing the first frequency as a braking frequency for the actuator.

16. The method of claim 1, wherein the actuator is a resonant actuator.

17. The method of claim 1, wherein the actuator is selected from the group consisting of a linear resonant actuator (LRA), a solenoid resonant actuator (SRA), and an eccentric rotating mass (ERM).

18. The method of claim 1, further comprising:
receiving input of actuator information; and
receiving input of test criteria including the first frequency.

19. The method of claim 18, wherein the actuator information includes at least one of physical specification, leads and connectors specification, operational specification, typical performance characteristics, typical haptic characteristics, and environmental characteristics.

20. The method of claim 18, wherein the test criteria include at least one of rated drive voltage, rated drive time, over drive voltage, over drive time, braking voltage, braking time, fall time threshold, test frequency bandwidth, frequency step size, and test duration.

21. A system for providing a desired haptic effect, the system comprises:
an actuator;
a sensor associated with the actuator and configured to measure acceleration of the actuator;
an actuator drive circuit coupled to the sensor, the actuator drive circuit configured to:
generate a first drive signal;
transmit the first drive signal to the actuator to drive the actuator;
generate a first braking signal, the first braking signal having a first frequency and being out of phase to the first drive signal;
transmit the first braking signal to the actuator; and
receive a data signal representative of acceleration of the actuator in response to the first drive signal and the first braking signal; and
a processor coupled to the actuator drive circuit, the processor configured to obtain first acceleration data based on the data signal;
determine a first acceleration value, from the first acceleration data, at a time of braking the actuator; and
determine whether the first acceleration value meets a threshold value, the threshold value representative of an acceleration value for a predetermined braking characteristic
apply a braking signal having the first frequency to the actuator to generate the desired haptic effect according to the predetermined braking character.

22. The system of claim 21, further comprising:
an input device configured to receive user input of test criteria including the first frequency.

23. The system of claim 21, wherein the processor is configured to, in response to determining that the first acceleration value meets the threshold value, store the first frequency as an optimal braking frequency for the actuator.

24. The system of claim 21, wherein the first acceleration value is the minimum acceleration value from the first acceleration data after a time of applying the first braking signal to the actuator.

25. The system of claim 21,
wherein the actuator drive circuit is configured to:
generate a second drive signal;
transmit the second drive signal to the actuator to drive the actuator;
generate a second braking signal, the second braking signal having a second frequency different from the first frequency and being out of phase to the second drive signal;
transmit the second braking signal to the actuator; and
receive a second data signal representative of acceleration of the actuator in response to the second drive signal and the second braking signal, and
wherein the processor is configured to:
obtain second acceleration data based on the second data signal;
determine a second acceleration value, from the second acceleration data, at a time of braking the actuator;
determine whether the second acceleration value meets the threshold value;
determine whether the second acceleration value is smaller than the first acceleration value; and
in response to determining that the second acceleration value is smaller than the first acceleration value, store the second frequency as an optimal braking frequency for the actuator.

26. The system of claim 21, wherein the actuator is a resonant actuator.

27. A method for providing a desired haptic effect, the method comprising:
- applying a first drive signal to an actuator, wherein the actuator is a resonant actuator;
- applying a first braking signal to the actuator, the first braking signal having a first frequency and being out of phase to the first drive signal;
- obtaining first acceleration data of the actuator in response to the first drive signal and the first braking signal;
- determining a first acceleration value, from the first acceleration data, at a time of braking the actuator;
- determining whether the first acceleration value meets a threshold value, the threshold value representative of an acceleration value for a predetermined braking characteristic;
- storing the first frequency as an optimal braking frequency for the actuator if the first acceleration value meets the threshold value;
- applying a braking signal having the first frequency to the actuator to generate the desired haptic effect according to the predetermined braking character by shifting the phase of the first drive signal, wherein the first braking signal has the same amplitude as the first drive signal;
- repeating the steps of applying a first drive signal, applying a first braking signal, obtaining first acceleration data, determining a first acceleration value, and determining whether the first acceleration value meets a threshold value;
- determining the smallest value of the first acceleration values that meet the threshold value; and
- storing a frequency corresponding to the smallest value as an optimal braking frequency for the actuator;
- applying a second drive signal to the actuator to drive the actuator;
- applying a second braking signal to the actuator, the second braking signal having a second frequency different from the first frequency and being out of phase to the second drive signal;
- obtaining second acceleration data of the actuator in response to the second drive signal and the second braking signal;
- determining a second acceleration value, from the second acceleration data, at a time of braking the actuator;
- determining whether the second acceleration value meets the threshold value;
- determining whether the second acceleration value is smaller than the first acceleration value; and
- in response to determining that the second acceleration value is smaller than the first acceleration value, storing the second frequency as an optimal braking frequency for the actuator;
- receiving input of actuator information; and
- receiving input of test criteria including the first frequency.

* * * * *